(12) United States Patent
Lee et al.

(10) Patent No.: US 12,540,226 B2
(45) Date of Patent: Feb. 3, 2026

(54) ELECTRICALLY CONDUCTIVE HYDROGEL HAVING GRAPHENE NETWORK AND FABRICATION METHOD THEREFOR

(71) Applicant: Gwangju Institute of Science and Technology, Gwangju (KR)

(72) Inventors: Jae Young Lee, Gwangju (KR); Jung Geon Park, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 533 days.

(21) Appl. No.: 18/135,219

(22) Filed: Apr. 17, 2023

(65) Prior Publication Data

US 2023/0365775 A1 Nov. 16, 2023

(30) Foreign Application Priority Data

May 11, 2022 (KR) ........................ 10-2022-0057783

(51) Int. Cl.
| | | |
|---|---|---|
| *C08J 9/28* | (2006.01) | |
| *A61L 31/02* | (2006.01) | |
| *A61L 31/04* | (2006.01) | |
| *A61L 31/14* | (2006.01) | |
| *C08J 9/00* | (2006.01) | |
| *C08K 3/04* | (2006.01) | |
| *C12N 5/00* | (2006.01) | |

(52) U.S. Cl.
CPC ............ *C08J 9/283* (2013.01); *A61L 31/024* (2013.01); *A61L 31/042* (2013.01); *A61L 31/145* (2013.01); *A61L 31/146* (2013.01); *C08J 9/0071* (2013.01); *C08K 3/042* (2017.05); *C12N 5/0068* (2013.01); *C08J 2201/0504* (2013.01); *C08J 2205/022* (2013.01); *C08J 2207/10* (2013.01); *C08J 2305/12* (2013.01); *C08K 2201/001* (2013.01); *C08K 2201/011* (2013.01); *C12N 2533/76* (2013.01)

(58) Field of Classification Search
CPC .. C08J 9/283; C08J 9/0071; C08J 2201/0504; C08J 2205/022; C08J 2207/10; C08J 2305/12; C08J 3/126; C08J 3/075; A61L 31/024; A61L 31/042; A61L 31/145; A61L 31/146; A61L 27/52; A61L 27/20; C08K 3/042; C08K 2201/001; C08K 2201/011; C12N 5/0068; C12N 2533/76; C12N 2529/00; C12N 2531/00; C12N 5/0075; C08L 5/12
See application file for complete search history.

(56) References Cited

U.S. PATENT DOCUMENTS

2023/0386697 A1* 11/2023 Tringides ................ C08L 33/26

OTHER PUBLICATIONS

Zhang, "Fabrication of electrically conductive graphnee/polystyrene composites via a combination of latex and layer-by-layer assembly approaches," 2013, J. Mater. Res. 2013, vol. 28, No. 4, pp. 611-619. (Year: 2013).*
Q. Rong, W. Lei, M. Liu, Conductive Hydrogels as Smart Materials for Flexible Electronic Devices, Chem.—Eur. J. 24 (2018) 16930-16943. https://doi.org/10.1002/chem.201801302.
H. Yuk, B. Lu, X. Zhao, Hydrogel bioelectronics, Chem. Soc. Rev. 48 (2019) 1642-1667. https://doi.org/10.1039/C8CS00595H.
W. Zhang, P. Feng, J. Chen, Z. Sun, B. Zhao, Flexible Energy Storage Systems Based on Electrically Conductive Hydrogels, Prog. Polym. Sci. 88 (2019) 220-240. https://doi.org/10.1016/j.progpolymsci.2018.09.001.
J.C. Yang, J. Mun, S.Y. Kwon, S. Park, Z. Bao, S. Park, Electronic Skin: Recent Progress and Future Prospects for Skin-Attachable Devices for Health Monitoring, Robotics, and Prosthetics, Adv. Mater. 31 (2019) 1904765. https://doi.org/10.1002/adma.201904765.
Y. Liu, J. Liu, S. Chen, T. Lei, Y. Kim, S. Niu, H. Wang, X. Wang, A.M. Foudeh, J.B.-H. Tok, Z. Bao, Soft and elastic hydrogel-based microelectronics for localized low-voltage neuromodulation, Nat. Biomed. Eng. 3 (2019) 58-68. https://doi.org/10.1038/s41551-018-0335-6.
R. Green, Elastic and conductive hydrogel electrodes, Nat. Biomed. Eng. 3 (2019) 9-10. https://doi.org/10.1038/s41551-018-0342-7.
C. Cui, C. Shao, L. Meng, J. Yang, High-Strength, Self-Adhesive, and Strain-Sensitive Chitosan/Poly(acrylic acid) Double-Network Nanocomposite Hydrogels Fabricated by Salt-Soaking Strategy for Flexible Sensors, ACS Appl. Mater. Interfaces. 11 (2019) 39228-39237. https://doi.org/10.1021/acsami.9b15817.
C. Wang, K. Xia, H. Wang, X. Liang, Z. Yin, Y. Zhang, Advanced Carbon for Flexible and Wearable Electronics, Adv. Mater. 31 (2019) 1801072. https://doi.org/10.1002/adma.201801072.
A. Novikov, J. Goding, C. Chapman, E. Cuttaz, R.A. Green, Stretchable bioelectronics: Mitigating the challenges of the percolation threshold in conductive elastomers, APL Mater. 8 (2020) 101105. https://doi.org/10.1063/5.0005410.
V.R. Feig, H. Tran, M. Lee, Z. Bao, Mechanically tunable conductive interpenetrating network hydrogels that mimic the elastic moduli of biological tissue, Nat. Commun. 9 (2018) 2740. https://doi.org/10.1038/s41467-018-05222-4.
E.M. Ahmed, Hydrogel: Preparation, characterization, and applications: A review, J. Adv. Res. 6 (2015) 105-121. https://doi.org/10.1016/j.jare.2013.07.006.
J. Yi, G. Choe, J. Park, J.Y. Lee, Graphene oxide-incorporated hydrogels for biomedical applications, Polym. J. 52 (2020) 823-837. https://doi.org/10.1038/s41428-020-0350-9.

(Continued)

*Primary Examiner* — Robert S Jones, Jr.
*Assistant Examiner* — Joshua Caleb Bledsoe
(74) *Attorney, Agent, or Firm* — Revolution IP, PLLC

(57) ABSTRACT

Disclosed are an electrically conductive hydrogel having a graphene network and a method for fabricating the same. The electrically conductive hydrogel is fabricated by thermal annealing of granular hydrogel, and thus it has a porous structure, excellent electrical conductivity, and improved compressive modulus and yield stress. Accordingly, the electrically conductive hydrogel may be advantageously used in biomedical applications, such as scaffolds for tissue engineering, bioelectrodes, and biosensors.

18 Claims, 6 Drawing Sheets

(56) References Cited

OTHER PUBLICATIONS

Y. Shi, C. Ma, L. Peng, G. Yu, Conductive "Smart" Hybrid Hydrogels with PNIPAM and Nanostructured Conductive Polymers, Adv. Funct. Mater. 25 (2015) 1219-1225. https://doi.org/10.1002/adfm.201404247.

D. Li, R.B. Kaner, Graphene-Based Materials, Science. 320 (2008) 1170-1171. https://doi.org/10.1126/science.1158180.

S. Stankovich, D.A. Dikin, G.H.B. Dommett, K.M. Kohlhaas, E.J. Zimney, E.A. Stach, R.D. Piner, S.T. Nguyen, R.S. Ruoff, Graphene-based composite materials, Nature. 442 (2006) 282-286. https://doi.org/10.1038/nature04969.

K. Krishnamoorthy, M. Veerapandian, K. Yun, S.-J. Kim, The chemical and structural analysis of graphene oxide with different degrees of oxidation, Carbon. 53 (2013) 38-49. https://doi.org/10.1016/j.carbon.2012.10.013.

J. Phiri, P. Gane, T.C. Maloney, General overview of graphene: Production, properties and application in polymer composites, Mater. Sci. Eng. B. 215 (2017) 9-28. https://doi.org/10.1016/j.mseb.2016.10.004.

A.J. Marsden, D.G. Papageorgiou, C. Valles, A. Liscio, V. Palermo, M.A. Bissett, R.J. Young, I.A. Kinloch, Electrical percolation in graphene-polymer composites, 2D Mater. 5 (2018) 032003. https://doi.org/10.1088/2053-1583/aac055.

Y. Shao, M.F. El-Kady, C.-W. Lin, G. Zhu, K.L. Marsh, J.Y. Hwang, Q. Zhang, Y. Li, H. Wang, R.B. Kaner, 3D Freeze- Casting of Cellular Graphene Films for Ultrahigh-Power-Density Supercapacitors, Adv. Mater. 28 (2016) 6719-6726. https://doi.org/10.1002/adma.201506157.

C. Arndt, M. Hauck, I. Wacker, B. Zeller-Plumhoff, F. Rasch, M. Taale, A.S. Nia, X. Feng, R. Adelung, R.R. Schröder, F. Schütt, C. Selhuber-Unkel, Microengineered Hollow Graphene Tube Systems Generate Conductive Hydrogels with Extremely Low Filler Concentration, Nano Lett. 21 (2021) 3690-3697. https://doi.org/10.1021/acs.nanolett.0c04375.

W. Fan, C. Zhang, W.W. Tjiu, T. Liu, Fabrication of electrically conductive graphene/polystyrene composites via a combination of latex and layer-by-layer assembly approaches, J. Mater. Res. 28 (2013) 611-619. https://doi.org/10.1557/jmr.2012.437.

M.-J. Kim, J.-W. Park, B.G. Kim, Y.-J. Lee, Y.-C. Ha, S.-M. Lee, K.-J. Baeg, Facile fabrication of solution-processed solid-electrolytes for high-energy-density all-solid-state-batteries by enhanced interfacial contact, Sci. Rep. 10 (2020) 11923. https://doi.org/10.1038/s41598-020-68885-4.

A.C. Ferrari, D.M. Basko, Raman spectroscopy as a versatile tool for studying the properties of graphene, Nat. Nanotechnol. 8 (2013) 235-246. https://doi.org/10.1038/nnano.2013.46.

D. Yang, A. Velamakanni, G. Bozoklu, S. Park, M. Stoller, R.D. Piner, S. Stankovich, I. Jung, D.A. Field, C.A. Ventrice, R.S. Ruoff, Chemical analysis of graphene oxide films after heat and chemical treatments by X-ray photoelectron and Micro-Raman spectroscopy, Carbon. 47 (2009) 145-152. https://doi.org/10.1016/j.carbon.2008.09.045.

J. Liu, H. Zheng, P. Poh, H.-G. Machens, A. Schilling, Hydrogels for Engineering of Perfusable Vascular Networks, Int. J. Mol. Sci. 16 (2015). https://doi.org/10.3390/ijms160715997.

C.F. Guimaraes, L. Gasperini, A.P. Marques, R.L. Reis, The stiffness of living tissues and its implications for tissue engineering, Nat. Rev. Mater. 5 (2020) 351-370. https://doi.org/10.1038/s41578-019-0169-1.

S. Zhang, Z. Li, F. Xing, Review of Polarization Optical Devices Based on Graphene Materials, Int. J. Mol. Sci. 21 (2020) 1608. https://doi.org/10.3390/ijms21051608.

S. Boral, A. Saxena, H.B. Bohidar, Syneresis in agar hydrogels, Int. J. Biol. Macromol. 46 (2010) 232-236. https://doi.org/10.1016/j.ijbiomac.2009.12.008.

J. Deng, H. Yuk, J. Wu, C.E. Varela, X. Chen, E.T. Roche, C.F. Guo, X. Zhao, Electrical bioadhesive interface for bioelectronics, Nat. Mater. 20 (2021) 229-236. https://doi.org/10.1038/s41563-020-00814-2.

P. Nautiyal, B. Boesl, A. Agarwal, The mechanics of energy dissipation in a three-dimensional graphene foam with macroporous architecture, Carbon. 132 (2018) 59-64. https://doi.org/10.1016/j.carbon.2018.02.028.

E. Axpe, G. Orive, K. Franze, E.A. Appel, Towards brain-tissue-like biomaterials, Nat. Commun. 11 (2020) 3423. https://doi.org/10.1038/s41467-020-17245-x.

K.C. Spencer, J.C. Sy, K.B. Ramadi, A.M. Graybiel, R. Langer, M.J. Cima, Characterization of Mechanically Matched Hydrogel Coatings to Improve the Biocompatibility of Neural Implants, Sci. Rep. 7 (2017) 1952. https://doi.org/10.1038/s41598-017-02107-2.

E. Cambria, S. Brunner, S. Heusser, P. Fisch, W. Hitzl, S.J. Ferguson, K. Wuertz-Kozak, Cell-Laden Agarose-Collagen Composite Hydrogels for Mechanotransduction Studies, Front. Bioeng. Biotechnol. 8 (2020) 346. https://doi.org/10.3389/fbioe.2020.00346.

Kenry, W.C. Lee, K.P. Loh, C.T. Lim, When stem cells meet graphene: Opportunities and challenges in regenerative medicine, Biomaterials. 155 (2018) 236-250. https://doi.org/10.1016/j.biomaterials.2017.10.004.

J. Kim, Y.-R. Kim, Y. Kim, K.T. Lim, H. Seonwoo, S. Park, S.-P. Cho, B.H. Hong, P.-H. Choung, T.D. Chung, Y.-H. Choung, J.H. Chung, Graphene-incorporated chitosan substrata for adhesion and differentiation of human mesenchymal stem cells, J. Mater. Chem. B. 1 (2013) 933-938. https://doi.org/10.1039/C2TB00274D.

W. Liu, J. Li, M. Cheng, Q. Wang, K.W.K. Yeung, P.K. Chu, X. Zhang, Zinc-Modified Sulfonated Polyetheretherketone Surface with Immunomodulatory Function for Guiding Cell Fate and Bone Regeneration, Adv. Sci. 5 (2018) 1800749. https://doi.org/10.1002/advs.201800749.

Y. Xu, P.A. Patsis, S. Hauser, D. Voigt, R. Rothe, M. Gunther, M. Cui, X. Yang, R. Wieduwild, K. Eckert, C. Neinhuis, T.F. Akbar, I.R. Minev, J. Pietzsch, Y. Zhang, Cytocompatible, Injectable, and Electroconductive Soft Adhesives with Hybrid Covalent/Noncovalent Dynamic Network, Adv. Sci. 6 (2019) 1802077. https://doi.org/10.1002/advs.201802077.

K. Yang, Y. Li, X. Tan, R. Peng, Z. Liu, Behavior and Toxicity of Graphene and Its Functionalized Derivatives in Biological Systems, Small. 9 (2013) 1492-1503. https://doi.org/10.1002/smll.201201417.

H. Zhou, Z. Wang, W. Zhao, X. Tong, X. Jin, X. Zhang, Y. Yu, H. Liu, Y. Ma, S. Li, W. Chen, Robust and sensitive pressure/strain sensors from solution processable composite hydrogels enhanced by hollow-structured conducting polymers, Chem. Eng. J. 403 (2021) 126307. https://doi.org/10.1016/j.cej.2020.126307.

G. Ge, Y. Zhang, J. Shao, W. Wang, W. Si, W. Huang, X. Dong, Stretchable, Transparent, and Self-Patterned Hydrogel-Based Pressure Sensor for Human Motions Detection, Adv. Funct. Mater. 28 (2018) 1802576. https://doi.org/10.1002/adfm.201802576.

J. Yu, M. Wang, C. Dang, C. Zhang, X. Feng, G. Chen, Z. Huang, H. Qi, H. Liu, J. Kang, Highly stretchable, transparent and conductive double-network ionic hydrogels for strain and pressure sensors with ultrahigh sensitivity, J. Mater. Chem. C. 9 (2021) 3635-3641. https://doi.org/10.1039/D0TC05242F.

Y. Zhang, A. Le Friec, M. Chen, 3D anisotropic conductive fibers electrically stimulated myogenesis, Int. J. Pharm. 606 (2021) 120841. https://doi.org/10.1016/j.ijpharm.2021.120841.

H. Jo, M. Sim, S. Kim, S. Yang, Y. Yoo, J.-H. Park, T.H. Yoon, M.-G. Kim, J.Y. Lee, Electrically conductive graphene/polyacrylamide hydrogels produced by mild chemical reduction for enhanced myoblast growth and differentiation, Acta Biomater. 48 (2017) 100-109. https://doi.org/10.1016/j.actbio.2016.10.035.

J. Park, J.H. Choi, S. Kim, I. Jang, S. Jeong, J.Y. Lee, Micropatterned conductive hydrogels as multifunctional muscle-mimicking biomaterials: Graphene-incorporated hydrogels directly patterned with femtosecond laser ablation, Acta Biomater. 97 (2019) 141-153. https://doi.org/10.1016/j.actbio.2019.07.044.

G. Zhao, H. Qing, G. Huang, G.M. Genin, T.J. Lu, Z. Luo, F. Xu, X. Zhang, Reduced graphene oxide functionalized nanofibrous silk fibroin matrices for engineering excitable tissues, NPG Asia Mater. 10 (2018) 982-994. https://doi.org/10.1038/s41427-018-0092-8.

J. Wang, H. Wang, X. Mo, H. Wang, Reduced Graphene Oxide-Encapsulated Microfiber Patterns Enable Controllable Formation of

(56) References Cited

OTHER PUBLICATIONS

Neuronal-Like Networks, Adv. Mater. 32 (2020) 2004555. https://doi.org/10.1002/adma.202004555.
G. Zhao, Y. Feng, L. Xue, M. Cui, Q. Zhang, F. Xu, N. Peng, Z. Jiang, D. Gao, X. Zhang, Anisotropic conductive reduced graphene oxide/silk matrices promote post-infarction myocardial function by restoring electrical integrity, Acta Biomater. 139 (2022) 190-203. https://doi.org/10.1016/j.actbio.2021.03.073.

* cited by examiner

ELECTRICALLY CONDUCTIVE HYDROGEL HAVING GRAPHENE NETWORK AND FABRICATION METHOD THEREFOR

CROSS REFERENCE TO RELATED APPLICATIONS

This application claims priority and benefit under 35 U.S.C. § 119 based on Korean Patent Application No. KR 10-2022-0057783, filed on May 11, 2022, the contents of which are incorporated herein by reference in their entireties.

BACKGROUND

Technical Field

The present disclosure relates to an electrically conductive hydrogel having a graphene network and a method for fabricating the same.

Background Art

Conductive hydrogels have garnered great attention in biomedicine as they simultaneously present typical hydrogel (e.g., tissue-like softness and abundant hydration) and electrical properties (e.g., high electrical conductivity and high charge storage capacity) (Q. Rong et al., Chem. Eur. J. 24 (2018) 16930-16943; H. Yuk et al., Chem. Soc. Rev. 48 (2019) 1642-1667; and W. Zhang et al., Prog. Polym. Sci. 88 (2019) 220-240). These unique characteristics of conductive hydrogels have been recognized to be promising to interface with soft tissues while efficiently mediating electrical signals with living systems, which have made them very useful in diverse fields such as biological devices, biosensors, and bioelectrodes (J. C. Yang et al., Robotics, and Prosthetics, Adv. Mater. 31 (2019) 1904765; Y. Liu et al., Nat. Biomed. Eng. 3 (2019) 58-68; R. Green, Nat. Biomed. Eng. 3 (2019) 9-10; and C. Cui et al., ACS Appl. Mater. Interfaces. 11 (2019) 39228-39237).

Conductive hydrogels are typically composed of electrically conductive components and hydrophilic polymers, which are used for electrical signal transmission and structural/mechanical support, respectively. Representative conductive materials include metallic nanoparticles, conductive polymers, and carbon-based materials (W. Zhang et al., Prog. Polym. Sci. 88 (2019) 220-240). Recently, several conductive polymer-based hydrogels have been prepared as high-performance biomaterials. However, relatively large amounts of conductive polymers are required to achieve the appropriate electrical properties. Also, the electrical conductivity of conductive polymers is dramatically affected by their redox states, which may hinder their stable performance in dynamic biological environments. On the other hand, carbon-based materials, such as carbon nanotubes, graphene, fullerene, graphene oxide (GO), and reduced graphene oxide (rGO), offer multiple advantages such as high surface areas, high electron mobilities, and high mechanical flexibilities (C. Wang et al., Advanced Carbon for Flexible and Wearable Electronics, Adv. Mater. 31 (2019) 1801072). Nevertheless, it is highly desirable to use a small amount of a conductive component in the composite to maintain the original hydrogel properties and to avoid potential toxicity, although they have been reported to be biocompatible at low doses (A. Novikov et al., APL Mater. 8 (2020) 101105; and V. R. Feig et al., Nat. Commun. 9 (2018) 2740).

However, several issues remain unresolved in the fabrication of conductive hydrogels for biomedical applications. First, it is a challenge to obtain hydrogels having both good electrical conductivity and tissue-like softness because the incorporation of a large amount of conductive components in the composites increases not only electrical conductivity but also mechanical stiffness and brittleness (J. Yi et al., Polym. J. 52 (2020) 823-837; and Y. Shi et al., Adv. Funct. Mater. 25 (2015) 1219-1225). Second, the fabrication of various hydrogel constructs is usually complicated because prepolymer solutions containing conductive components, monomers, and initiators need to be prepared and cross-linked in a specific mold, and the prepared conductive hydrogel should be thoroughly washed to remove unreactive compounds and byproducts prior to use (E. M. Ahmed, J. Adv. Res. 6 (2015) 105-121). Lastly, the biocompatibility and utility of conductive hydrogels have not been well demonstrated for biomedical applications, leaving them at a premature stage of development. Therefore, it is necessary to develop highly conductive hydrogels having various shapes, which are fabricated by a simple fabrication process.

Graphene is a two-dimensional material having a honeycomb structure of carbon allotrope with extraordinary electrical conductivity (D. Li, R. B. Kaner, Science. 320 (2008) 1170-1171; and S. Stankovich et al., Nature. 442 (2006) 282-286). Graphene oxide (GO) and reduced graphene oxide (rGO) belong to the graphene family. GO is produced from graphite via oxidative exfoliation, possesses carboxyl and hydroxyl functional groups, is thus hydrophilic in nature, and has poor electrical properties (K. Krishnamoorthy et al., Carbon. 53 (2013) 38-49). rGO can be produced from GO by various reduction techniques (e.g., chemical or thermal reduction) that can improve the electrical properties by restoring $sp^2$ carbon atoms in GO. Because rGO is poorly dispersible in water or hydrophilic materials, it is difficult to form well-dispersed rGO and networks in hydrogels. Therefore, rGO dispersion with minimal agglomeration in hydrogel composites has been a strategy to improve the electrical conductivity of composite hydrogels with softness (J. Phiri et al., Mater. Sci. Eng. B. 215 (2017) 9-28). Generally, the simple dispersion of small amounts of graphene flakes (e.g., GO and rGO) in a hydrogel matrix is insufficient and inefficient to create a conductive network because graphene flakes are distributed in the entire hydrogel matrix and their connection is limited at low concentrations (A. J. Marsden et al., 2D Mater. 5 (2018) 032003). Accordingly, several studies have been conducted to produce conductive hydrogels having smaller amounts of conductive graphene components by establishing a structural arrangement of graphene flakes, which could form an interconnected graphene network by controlled freeze-drying processes or graphene deposition onto 3D template frameworks (Y. Shao et al., Adv. Mater. 28 (2016) 6719-6726 and C. Arndt et al., Nano Lett. 21 (2021) 3690-3697).

SUMMARY

An object of the present disclosure is to provide an electrically conductive hydrogel having a graphene network.

Another object of the present disclosure is to provide a method for fabricating an electrically conductive hydrogel having a graphene network, the method including performing thermal annealing of granular hydrogel.

Still another object of the present disclosure is to provide a scaffold for tissue engineering including the electrically conductive hydrogel having a graphene network.

Yet another object of the present disclosure is to provide a bioelectrode including the electrically conductive hydrogel having a graphene network.

Still yet another object of the present disclosure is to provide a biosensor including the electrically conductive hydrogel having a graphene network.

To achieve the above objects, the present disclosure provides an electrically conductive hydrogel having a graphene network, which is fabricated by thermal annealing of granular hydrogel.

In one embodiment of the present disclosure, the granular hydrogel may be produced by mixing of graphene-coated agarose microbeads having a positive surface charge and graphene-coated agarose microbeads having a negative surface charge.

In one embodiment of the present disclosure, the graphene-coated agarose microbeads may be produced by coating agarose microbeads with graphene flakes.

In one embodiment of the present disclosure, the graphene flakes may be composed of graphene oxide or positively charged polymer-conjugated graphene oxide, preferably polyethylenimine-conjugated graphene oxide.

In one embodiment of the present disclosure, the agarose microbeads may have a size of 10 μm to 50 μm, preferably 20 μm to 40 μm, more preferably 25 μm to 35 μm, still more preferably 29 μm to 31 μm, without being limited thereto.

In one embodiment of the present disclosure, the thermal annealing may cause the reorganization of the graphene flakes and the agarose microbeads.

In one embodiment of the present disclosure, the thermal annealing may be performed at 60° C. to 85° C. for 30 minutes to 60 minutes, preferably at 65° C. to 75° C. for 30 minutes to 60 minutes, more preferably at 70° C. for 60 minutes, without being limited thereto.

In one embodiment of the present disclosure, the hydrogel may have a porous structure.

In one embodiment of the present disclosure, the hydrogel may have an electrical conductivity of 1 to 30 mS cm$^{-1}$, preferably 5 to 25 mS cm$^{-1}$, more preferably 5 to 20 mS cm$^{-1}$, without being limited thereto.

In one embodiment of the present disclosure, the hydrogel may have improved or increased compressive modulus and yield stress.

The present disclosure also provides a method for fabricating an electrically conductive hydrogel having a graphene network, the method including performing thermal annealing of granular hydrogel.

The present disclosure also provides a scaffold for tissue engineering including the electrically conductive hydrogel having a graphene network.

In one embodiment of the present disclosure, the scaffold may be fabricated by 3D printing using granular hydrogel as an ink.

In one embodiment of the present disclosure, the scaffold may be patient-specific.

The present disclosure also provides a bioelectrode including the electrically conductive hydrogel having a graphene network.

In one embodiment of the present disclosure, the bioelectrode may be a bioelectrode for electromyography (EMG).

The present disclosure also provides a biosensor including the electrically conductive hydrogel having a graphene network.

In one embodiment of the present disclosure, the biosensor may be a pressure sensor or a strain sensor.

The electrically conductive hydrogel having a graphene network according to the present disclosure is fabricated by thermal annealing of granular hydrogel, and thus it has a porous structure, excellent electrical conductivity, and improved compressive modulus and yield stress. Accordingly, the electrically conductive hydrogel may be advantageously used in biomedical applications, such as scaffolds for tissue engineering, bioelectrodes, and biosensors.

DETAILED DESCRIPTION

Figure 1:
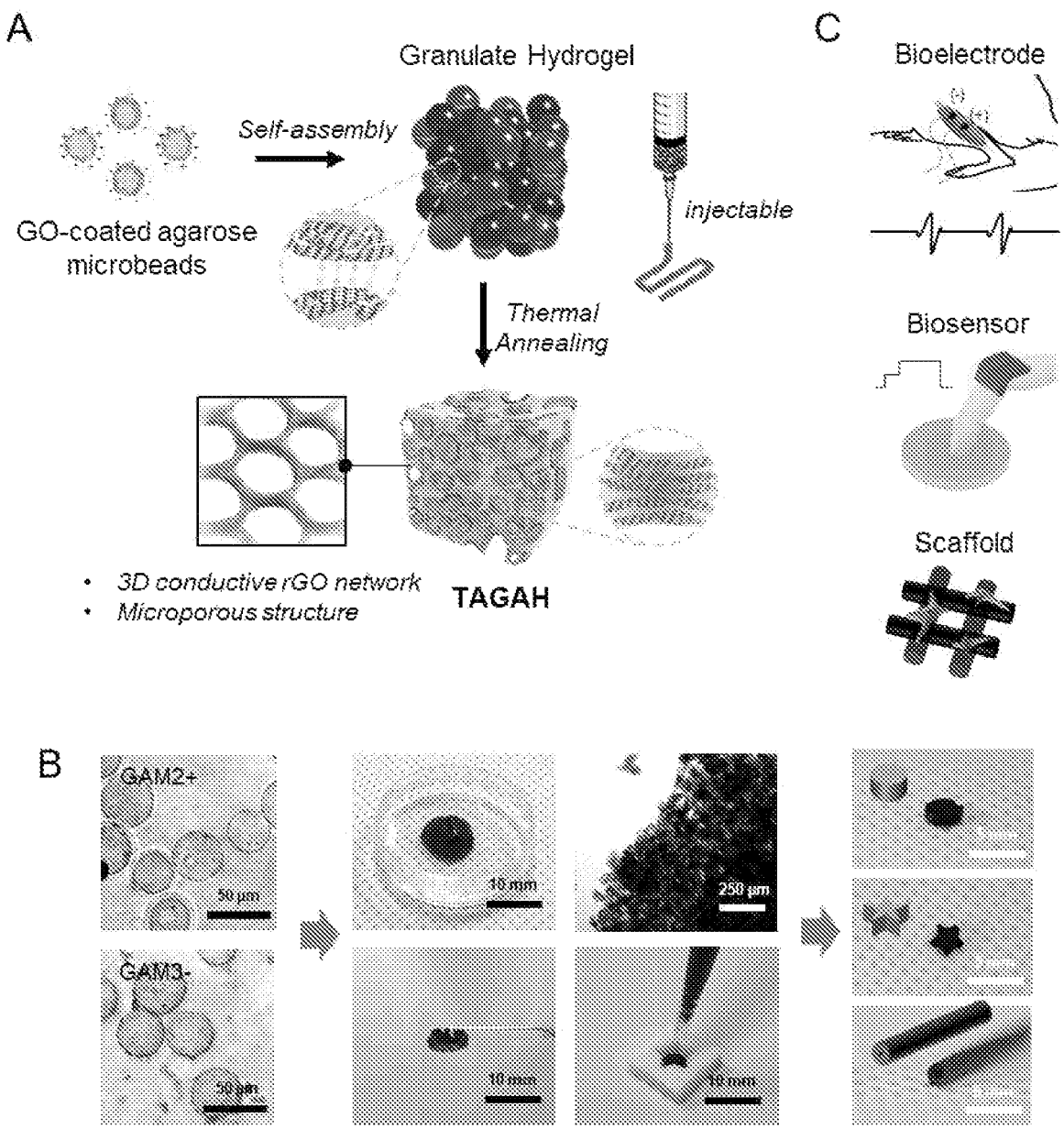
FIG. 1 shows (A) a schematic view illustrating the fabrication of a thermally annealed graphene-connected agarose hydrogel (TAGAH) using granular hydrogel (GH) self-assembled with graphene oxide (GO)-coated agarose microbeads (GAMs), (B) depicting images of the positively charged and negatively charged GAMs, GH, and TAGAH, and shows various shapes of TAGAH constructs produced by molding GH and subsequent thermal annealing (70° C. for 60 min), and (C) potential biomedical applications of TAGAH, such as bioelectrodes, biosensors, and 3D-printed conductive tissue scaffolds.

Hereinafter, the present disclosure will be described in detail.

The terms used in the present disclosure are currently widely used general terms selected in consideration of their functions in the present disclosure, but they may change depending on the intents of those skilled in the art, precedents, or the advents of new technology. Additionally, in certain cases, there may be terms arbitrarily selected by the applicant, and in this case, their meanings are described in a corresponding description part of the present disclosure. Accordingly, terms used in the present disclosure should be defined based on the meaning of the term and the entire contents of the present disclosure, rather than the simple term name.

Throughout the present specification, it is to be understood that when any part or method is referred to as "including" any component or step, it does not exclude other components or steps, but may further include other components or steps, unless otherwise specified.

The present disclosure provides an electrically conductive hydrogel having a graphene network, which is fabricated by thermal annealing of granular hydrogel.

As used herein, the term "hydrogel" refers to a material capable of containing a large amount of water by having a three-dimensionally crosslinked hydrophilic polymer structure formed by hydrogen bonds, physical bonds such as ionic bonds, or chemical covalent bonds.

As used herein, the term "graphene" refers to an allotrope of carbon in which carbon atoms are connected together in a hexagonal honeycomb shape to form a two-dimensional planar structure.

As used herein, the term "thermal annealing" refers to a heat treatment process capable of changing the physical or chemical properties of a material.

In the present disclosure, the granular hydrogel may be produced by mixing of graphene-coated agarose microbeads (GAMs) having a positive surface charge and graphene-coated agarose microbeads (GAMs) having a negative surface charge.

In particular, the granular hydrogel may be produced by mixing and self-assembly of two types of microbeads having different surface charges, and thus the hydrogel may be prepared without a special chemical crosslinking agent or reagent and without requiring a special washing step.

In the present disclosure, the graphene-coated agarose microbeads may be produced by coating agarose microbeads with graphene flakes, and the graphene flakes may be composed of graphene oxide or positively charged polymer-conjugated graphene oxide, preferably polyethylenimine-conjugated graphene oxide.

Preferably, the graphene-coated agarose microbeads (GAMs) having a positive surface charge may be produced by coating agarose microbeads with positively charged polyethylenimine (PEI)-conjugated graphene oxide, and the graphene-coated agarose microbeads (GAMs) having a negative surface charge may be produced by coating agarose microbeads with negatively charged graphene oxide.

More preferably, the graphene-coated agarose microbeads (GAMs) having a positive surface charge may be produced by coating positively charged agarose microbeads with polyethylenimine (PEI) to produce AM(PEI), then coating AM(PEI) with a negatively charged graphene oxide layer in a graphene oxide suspension to produce GAM1−, and then coating GAM1− with a positively charged graphene oxide layer in a polyethylenimine (PEI)-conjugated graphene oxide suspension to produce GAM2+. In addition, the graphene-coated agarose microbeads (GAMs) having a negative surface charge may be produced by coating the GAM2+ with a negatively charged graphene oxide in a graphene oxide suspension to produce GAM3−.

More preferably, the granular hydrogel may be produced by mixing of the graphene-coated agarose microbeads having a positive surface charge, GAM2+, and the graphene-coated agarose microbeads having a negative surface charge, GAM3−.

In particular, the hydrogel produced by mixing GAM2+ and GAM3 has higher electrical conductivity than the hydrogel produced by mixing of GAM1− and GAM2+ or the hydrogel produced by mixing of GAM3− and GAM4+, and contains a smaller amount of graphene oxide, and thus it is more suitable for biomedical applications.

In the present disclosure, the agarose microbeads may have a size of 10 µm to 50 µm, preferably 20 µm to 40 µm, more preferably 25 µm to 35 µm, still more preferably 29 µm to 31 µm, without being limited thereto.

In the present disclosure, agarose microbeads having a size of less than 10 µm contain a larger amount of graphene oxide due to their high surface area-to-volume ratio, and thus are unfavorable for biocompatibility, may form random contacts with other spheres, and may form inefficient conductive channels, indicating that they are not suitable for the fabrication of a hydrogel containing graphene. In addition, agarose microbeads having a size of more than 50 µm have fewer contact points with other spheres at a given volume, and thus are unfavorable for close packing and graphene network formation during thermal annealing, indicating that they are not suitable for the fabrication of a hydrogel containing graphene.

In the present disclosure, the thermal annealing may cause the reorganization of the graphene flakes and the agarose microbeads. In addition, the thermal annealing may be performed at 60° C. to 85° C. for 30 minutes to 60 minutes, preferably at 65° C. to 75° C. for 30 minutes to 60 minutes, more preferably at 70° C. for 60 minutes, without being limited thereto.

In the present disclosure, the conductivity of a hydrogel produced by thermal annealing at a low temperature lower than 60° C. does not significantly increase even after 60 minutes, and the conductivity of a hydrogel produced by thermal annealing at a temperature higher than 85° C. increases rapidly with time and then decreases. For these reasons, in consideration of reproducibility and convenience, thermal annealing for the fabrication of the hydrogel may be performed under the above-described conditions.

In the present disclosure, the hydrogel may have a porous structure, and preferably a well-connected honeycomb-like macroporous network structure.

In one embodiment of the present disclosure, the hydrogel may have an electrical conductivity of 1 to 30 mS cm$^{-1}$, preferably 5 to 25 mS cm$^{-1}$, more preferably 5 to 20 mS cm$^{-1}$, without being limited thereto.

In the present disclosure, the hydrogel may have improved or increased compressive modulus and yield stress. In particular, the hydrogel may have improved or increased compressive modulus and yield stress compared to a hydrogel made of agarose microbeads or a hydrogel produced by mixing graphene oxide and agarose microbeads.

The present disclosure also provides a method for fabricating an electrically conductive hydrogel having a graphene network, the method including performing thermal annealing of granular hydrogel.

Preferably, the present disclosure provides a method for fabricating an electrically conductive hydrogel having a graphene network, the method including: (a) producing graphene-coated agarose microbeads (GAMs) having a positive or negative surface charge by coating agarose microbeads with graphene flakes; (b) producing a self-assembled granular hydrogel (GH) by mixing the graphene-coated agarose microbeads (GAMs) having a positive surface charge, produced in (a), and the graphene-coated agarose microbeads (GAMs) having a negative surface charge, produced in (a); and (c) performing thermal annealing of the granular hydrogel (GH) produced in step (b).

In the present disclosure, the graphene flakes may be composed of graphene oxide or positively charged polymer-conjugated graphene oxide, preferably polyethylenimine-conjugated graphene oxide.

The present disclosure also provides a scaffold for tissue engineering including the electrically conductive hydrogel having a graphene network.

As used herein, the term "scaffold" refers to a physical support and adhesive substrate made to enable in vitro culture, ex vivo culture and in vivo transplantation of tissue cells. Scaffolds are used for the transplantation of cells for human tissue regeneration, and in order for stem cells or cells obtained from biopsies to be effectively used in patients, the largest possible number of cells must be obtained in vitro or ex vivo, and thus mass culture and proliferation of cells is very important. In particular, the scaffold should be non-toxic and biocompatible so as not to cause blood coagulation or inflammatory reaction after transplantation, and should be completely biodegradable in vivo after transplanted cells perform their original function and role.

In the present disclosure, characteristics such as cytocompatibility and biocompatibility of the electrically conductive hydrogel having a graphene network were evaluated to confirm whether the hydrogel is applicable as a scaffold for tissue engineering.

In the present disclosure, the scaffold may be fabricated by 3D printing using granular hydrogel as an ink, without being limited thereto.

In the present disclosure, the scaffold may be patient-specific.

The present disclosure also provides a bioelectrode including the electrically conductive hydrogel having a graphene network.

As used herein, the term "bioelectrode" refers to a device designed to transmit electrical signals between body organs and tissues, which is used for the purpose of electrically interacting with tissues and cells.

The bioelectrode may be used for the purpose of recording electrical signals from the body for a long or short period of time after being brought into contact with a specific body part, or transmitting electrical stimuli to the body to control the electrical activity of cells and tissues, and studying various diseases through electrical therapy.

In the present disclosure, it was confirmed that the electrically conductive hydrogel having a graphene network may be applied as a bioelectrode, because it has low impedance capable of mediating fine electrical signals in vivo, stably interacts with living tissue, and has excellent biocompatibility.

In one embodiment of the present disclosure, the bioelectrode may be a bioelectrode for electromyography (EMG) or electrocardiography.

The present disclosure also provides a biosensor including the electrically conductive hydrogel having a graphene network.

As used herein, the term "biosensor" refers to a biological device capable of detecting or sensing the presence of a specific substance in metabolites or biomolecules.

In the present disclosure, the biosensor may be a pressure sensor or a strain sensor.

In the present disclosure, it was confirmed that the electrically conductive hydrogel having a graphene network may be used as a pressure sensor because pressure changes can be measured by the hydrogel, and that the hydrogel may also be used as a strain sensor because it can induce resistance changes in response to bending movement.

Hereinafter, the present disclosure will be described in more detail with reference to examples. These examples are intended to explain the present disclosure in more detail, and the scope of the present disclosure is not limited to these examples.

Example 1. Experimental Method 1.1. Materials

Low-gelling-temperature agarose, branched polyethylenimine (PEI), N-hydroxysuccinimide (NHS), Span 80, and Triton X-100 were obtained from Sigma-Aldrich (St. Louis, MO, USA). Light mineral oil was purchased from Fisher Chemical (Thermo Fisher Scientific, Waltham, MA, USA). 1-(3-dimethylaminopropyl)-3-ethylcarbodiimide hydrochloride (EDC) was obtained from Tokyo Chemical Industry (Tokyo, Japan). An aqueous GO solution (6 mg mL$^{-1}$) was purchased from Graphene Supermarket (Calverton, NY, USA). Bovine serum albumin (BSA) was purchased from Bovogen Biologicals (Keilor East, Victoria, Australia). 4,6-diamidino-2-phenylindole (DAPI), Alexa Fluor 555-labeled goat anti-rabbit IgG, and Alexa Fluor 488-labeled goat anti-rabbit IgG were obtained from Life Technologies (Invitrogen, Carlsbad, CA, USA). Anti-mannose receptor antibody and recombinant anti-CCR7 antibody were purchased from Abcam (Cambridge, UK). Dulbecco's modified Eagle's medium (DMEM), Dulbecco's phosphate-buffered saline (DPBS), and fetal bovine serum (FBS) were obtained from Gibco (Rockville, MD, USA). An antibiotic-antimycotic solution was obtained from Invitrogen.

1.2. Fabrication of Agarose Microbeads (AMs)

Agarose microbeads (hereinafter referred to as "AMs") were fabricated using an oil-in-water emulsion. Mineral oil containing 5% (v/v) Span 80 and 0.5% (v/v) Triton X-100 was heated to 90° C. Next, 5% (w/v) of a low-melting-temperature agarose solution was added, followed by stirring at 700 rpm. After 6 hours of stirring, the solution was left at room temperature to solidify the AMs. The solidified AMs were collected by centrifugation at 3,000 rpm for 3 min. The collected AMs were washed twice with isopropanol and twice with distilled water. For each washing step, the AMs were centrifuged at 3,000 rpm for 3 min after dispersion in each solution. The purified AMs were classified into three groups of diameter 8, 31 and 75 μm according to size using 30- and 50-μm sieves.

1.3. Synthesis of Graphene Oxide (GO)-Polyethylenimine (PEI)

PEI-conjugated GO (hereinafter referred to as GO-PEI) was produced according to a previously reported method (W. Fan et al., J. Mater. Res. 28 (2013) 611-619). In brief, a GO stock solution (6 mg mL$^{-1}$) was diluted to 0.5 mg mL$^{-1}$ in PBS (pH=7.4). Branched PEI was mixed into the GO solution to obtain a PEI concentration of 1 mg mL$^{-1}$. The mixture was then ultrasonicated for 30 min. Then, 15 mM 1-(3-dimethylaminopropyl)-3-ethylcarbodiimide hydrochloride (EDC) and 30 mM N-hydroxysuccinimide (NHS) were added to the solution and vigorously stirred for 24 hours. The product was washed thrice with distilled water by ultracentrifugation at 17,000 rpm for 20 min. Finally, the purified GO-PEI was stored at 4° C. until further use.

1.4. Fabrication of GO-Coated Agarose Microbeads

GO-coated agarose microbeads (hereinafter referred to as GAMs) displaying different charges were fabricated using the LbL method. First, AMs were coated with PEI by incubation in 1 mg mL$^{-1}$ branched PEI solution and stirred at 850 rpm for 2 hour to produce positively charged AMs (i.e., AM(PEI)). AM(PEI) was washed thrice with DI water and centrifuged at 3,000 rpm for 3 min. Then, AM(PEI) was incubated in 0.25 mg mL$^{-1}$ GO suspension with stirring at 850 rpm for 2 h to stack a first GO layer (negative charge) on AM(PEI), thus producing GAM1−. Then, GAM1− was transferred to 0.25 mg mL$^{-1}$ GO-PEI suspension to form a second GO layer (positive charge), thus producing GAM2+. Finally, GAM3− was produced by stacking a third GO layer by incubation with GAM2+ in a GO suspension. Each GAM was washed thrice with DI water and then with PBS.

1.5. Fabrication of Granular Hydrogel

Granular hydrogen (hereinafter referred to as GH) was produced by mixing GAM2+ and GAM3− at a volume ratio of 1:1. GH was promptly formed by self-assembly and filtered through a sieve (10 μm) to remove excess water. The GH was transferred to various molds and heated at various temperatures (60, 70, or 85° C.) for various periods (0 to 120 min). To prevent evaporation during heating, GH was placed in a small glass chamber. After thermal annealing, the sample (thermally annealed graphene-channeled agarose hydrogel, TAGAH) was cooled to room temperature. Then, the sample was stabilized by incubation in DI water for several hours. The GO content of GH was quantified using UV/vis spectrophotometry (BioDrop Duo+, Biochrom, UK). In brief, the standard GO and UV absorbance curves (at 230 nm) were first prepared. The sample (GAM or GH) was dispersed in DI water and sonicated for 1 min to dissociate the GO from the beads. The sample solution was then shortly incubated at 60° C. for 5 min, which resulted in melting the agarose beads and the complete dispersion of GO. Then, the GO was collected and washed three times by centrifugation (17,000 rpm, 10 min). Note that no GO-related peak was observed in the spectra of the supernatant solutions obtained during the washing process, indicating that the GO could be collected from the sample without substantial losses. Finally, the GO pellet was suspended in DI water and its absorbance was measured at 230 nm. The GO contents were quantified based on the standard curve. The PBS solution incubated with TAGAH for 1 week at 25° C. had an absorbance spectrum similar to that of fresh PBS, indicating that no rGO was eluted from TAGAH, and that the rGO content in TAGAH was well maintained in the aqueous solution. A GO-containing agarose composite (GO/agarose) was also prepared as a control. In brief, a GO stock solution (6 mg mL$^{-1}$ in DI water) was added to a warm agarose solution (5 w/v % of the final concentration) to achieve a final concentration of 1.52 mg mL$^{-1}$. Next, the GO/agarose solution was placed into a casting mold and allowed to gel at 25° C.

1.6. Characterization of Electrical and Electrochemical Properties

A 4-point probe method was employed to measure the electrical conductivity of the hydrogels. Each flat hydrogel (0.5 mm thickness) was incubated in PBS or distilled water prior to measurement. Conductivity was calculated from the sheet resistance measured at a scan rate of 50 mV s$^{-1}$ by linear scanning voltammetry using a computer-assisted electrochemical device (VersaSTAT 3, Princeton Applied Research/AMETEK Scientific Instruments, Princeton, NJ, USA). For electrical impedance spectroscopy (EIS) measurement, a 0.5 mm thick flat disc of each sample was incubated in PBS prior to the measurement. Each hydrogel was placed between gold-coated glass electrodes. An alternative sinusoidal potential of 10 mV was applied between the electrodes in a frequency range of 1 to $10^5$ Hz using a computer-assisted electrochemical device (VersaSTAT 3, Princeton Applied Research/AMETEK Scientific Instruments). For the preparation of a sample for CV measurement, a Teflon-coated platinum wire was inserted into the sample (agarose or GO/agarose) at 70° C., and then the solution was cooled. In the case of TAGAH, a Teflon-coated platinum wire was inserted in the middle of the GH, and then thermal annealing was performed. Each prepared hydrogel was connected to a 3-electrode system, in which the sample served as the working electrode, and a platinum rod and Ag/AgCl (3M KCl) were connected to a counter and a reference electrode, respectively. Then, cyclic voltammetry was performed in PBS (10 mM, pH 7.4) from −0.8 V to 0.8 V at a scan rate of 0.05 V s$^{-1}$ using the computer-assisted electrochemical device. The charge storage capacitance was calculated to measure the area of each CV.

1.7. Characterization of Mechanical Properties

The mechanical properties of the hydrogels were characterized using a rheometer (Kinexus; Malvern Instruments, Worcestershire, UK) and Universal Testing Machine (TO-100-IC, Testone, Gyeonggi-do, Republic of Korea). The shear modulus was measured with 0.5% strain in a 0.1 to 10 Hz frequency range at 37° C. using a rheometer. Young's moduli were calculated from the shear moduli at a frequency of 1 Hz. The compressive test was performed at a compressive speed of 10 mm min$^{-1}$ using the Universal Testing Machine. Fracture strain was defined as the strain at the end of the plateau stage, and the yield stress was determined as the maximum allowable load at the limit of elastic behavior. Compressive modulus was calculated from the slope in the strain-stress in the linear region up to the proportional limit before the yield stress point.

1.8. Microscopic Analysis

Confocal microscopy was performed to study the structure of each hydrogel in the aqueous state. Each hydrogel was soaked in 0.05 mg mL$^{-1}$ methylene blue solution. Fluorescence images were immediately acquired using a confocal microscope (Fluoview FV1000 IX8, Olympus, Tokyo, Japan) with 668 nm excitation wavelength and 688 nm emission wavelength, and 3D stack images were obtained using the ImageJ software (National Institutes of Health, Bethesda, MD, USA). The structural orientation of the graphene flakes was observed using a polarization microscope. Each hydrogel embedded with optimal cutting temperature (OCT) compound was cryo-sectioned to a thickness of 5 μm. After removing the OCT with DI water, micrographs were acquired using a polarization microscope (DM2500, Leica Microsystems GmbH, Wetzlar, Germany). The porous structure of TAGAH was analyzed using SEM (Verios 5 UC, Thermo Fisher Scientific) equipped with EDS. Prior to SEM measurement, each hydrogel was freeze-dried and cut to evaluate the internal pores in the cross-section. Then, each sample was coated with 10-nm thick platinum.

For TEM analysis, cryomicrotomy was first performed using a Leica ultramicrotome (Leica EM UC7, Vienna, Austria) with a cryochamber (Leica Cryochamber EM FC7). The frozen hydrogel was cut into ultrathin sections of 30 nm thickness at −80° C. using an ultramicrotome equipped with a glass knife at a 2 mm s$^{-1}$ cutting rate. The sectioned specimen was placed on a 200 mesh formvar/carbon-coated copper grid (Electron Microscopy Sciences, Hatfield, PA, USA). TEM, SAED, and elemental analyses of TAGAH were conducted using a JEM-2100 Electron Microscope (JEOL, Tokyo, Japan) equipped with an EDS detector (X-MaxN, Oxford Instruments, Oxford, UK). The TEM images were acquired using a bottom-mounted charge-coupled device (Tengra, EMSIS GmbH, Germany) camera. The obtained images were analyzed using the RADIUS imaging software (Olympus Soft Imaging Solutions, Munster, Germany). The chemical composition of the macroporous structure was obtained through EDS mapping in STEM mode, and line profiles along the networks were studied using the EDS analysis software AZtec 2.2 SP2 (X-MaxN, Oxford Instruments). The mean distribution curves of the chemical composition were generated using the average multiple curves function in Origin 2018 software version 9.5 (OriginLab, Northampton, MA, USA).

1.9. Raman Spectroscopy

Thermal reduction and stacking of the GO components in the hydrogel were studied by Raman spectroscopic analysis. The hydrogels were analyzed using a 532 nm laser of Raman spectrometer (UniRaman; UniThink, Inc., Gyeonggi, Republic of Korea). The intensities of the D band at 1350 cm$^{-1}$, the G band at 1580 cm$^{-1}$, and the 2D band at 2680 cm$^{-1}$ were measured to calculate the ratios (i.e., $I_G/I_D$ and $I_{2D}/I_G$) of these bands from the spectra.

1.10. In Vitro Culture

NIH-3T3 fibroblasts were maintained in tissue culture plates in growth medium (10% (v/v) FBS and 1% (v/v) antibiotic-antimycotic solution in high glucose DMEM) at 37° C. under 5% $CO_2$. Each hydrogel with a flat disc shape was sterilized by incubation in 70% ethanol under ultraviolet light for 3 hours, followed by washing with sterile DPBS. Then, the sterilized sample was incubated overnight in growth medium. NIH-313 fibroblasts were seeded at a density of $1.0 \times 10^4$ cells cm$^{-2}$ on each sample. The cytotoxicity of the scaffolds was measured by lactate dehydrogenase assay after 1, 3, and 5 days of culture, according to the manufacturer's instructions (Takara Bio, Shiga, Japan). Cell number and morphology on each scaffold were analyzed by immunofluorescence staining of nuclei and F-actin. After cell culture, individual samples were fixed with 3.7% (w/v) paraformaldehyde for 1 hour. After washing twice with PBS, the samples were incubated in permeabilization/blocking solution (0.1% (v/v) Triton X-100, 5% (w/v) BSA in DPBS) at 4° C. for 1 hour. Next, the samples were incubated in Alexa Fluor 488 phalloidin in permeabilization/blocking solution (1:200 ratio) for 30 min. After washing with PBS twice, the samples were incubated in DAPI in permeabilization/blocking solution (1:2000 ratio) for 3 min. Finally, after washing twice with PBS, fluorescence images were acquired using a fluorescence microscope (DMI3000 B, Leica).

1.11. In Vivo Implantation Experiment

All animal experiments were performed with permission from the Committee on Animal Research and Ethics at the Gwangju Institute of Science and Technology, Republic of Korea (Approval number: GIST-2021-026). To analyze histocompatibility, 6-week-old BALB/c mice (20 g, male) were obtained from Orientbio (Seongnam, Gyeonggi, Republic of Korea). Mice were anesthetized with 2% isoflurane, and the midline of the back skin was incised. The samples (GO/agarose and TAGAH) were sterilized as described earlier in the in vitro experiment. The sample was implanted subcutaneously in the incision area, followed by suturing using a 6-0 suture. After 1, 4, and 8 weeks of implantation, the mice were sacrificed. Skin and muscle tissues containing the transplanted hydrogel were obtained. The tissues were fixed with 3.7% (w/v) paraformaldehyde for 1 hour. After washing twice with PBS, the tissue was incubated in 30% (w/v) sucrose solution for 3 days. Each tissue embedded with OCT was cryo-sectioned into slices of 5-μm thickness. After removing the OCT with distilled water, hematoxylin and eosin (H&E) staining was performed. Microscopic images of the H&E-stained tissue blocks were acquired using an optical microscope. For macrophage immunostaining, the tissue sections were fixed with acetone for 20 min. After drying for 5 min, the fixed sections were washed twice with PBS. For antigen retrieval, the sections were heated in citric acid buffer (pH 6.0) at 100° C. for 20 min. The sections were incubated with 3% (v/v) goat serum and 3% (w/v) BSA blocking solution for 90 min at room temperature. After blocking, the sections were washed twice with PBS. Then, the sections were incubated with the primary antibodies (rabbit anti-CD206 or rabbit anti-CCR7 antibody) diluted 1:100 in PBS at 4° C. overnight. After washing twice with PBS, the sections were incubated with secondary antibodies (goat anti-rabbit IgG-Alexa Fluor 555) diluted 1:1,000 in PBS at room temperature for 60 min. For quenching autofluorescence, the sections were incubated with 0.1% (w/v) Sudan Black B in 70% (v/v) ethanol at room temperature for 60 min. The sections were washed twice with PBS and incubated with DAPI in PBS (1:2,000 ratio) for 3 min. Finally, after washing twice with PBS, fluorescence images were acquired using a fluorescence microscope (DMI3000 B, Leica).

1.12. Electromyography (EMG) Recording

Six-week-old Sprague-Dawley rats were anesthetized with 3% isoflurane. Skin and muscle incisions were made in the thigh area, and the sciatic nerve was exposed. A hydrogel electrode was placed on the tibialis anterior. While electrical simulation (1 V and 1 Hz) was applied to the sciatic nerve with a hook-type platinum stimulator electrode, EMG signals from the hydrogel were recorded with Biopac MP36 (Biopac Systems, Goleta, CA, USA). The signal-to-noise ratio (SNR) was calculated according to the following equation: $SNR = 10 \log (A_{signal}/A_{noise})$

1.13. Pressure Sensor and Strain Sensor Tests

For the pressure sensor test, a cylindrical hydrogel with a diameter of 8 mm and length of 3 mm was prepared and placed between the gold plates. Different compressive pressures were applied to the upper gold plate of the sensor, and the resistance change was measured using a computer-assisted electrochemical device (VersaSTAT 3, Princeton Applied Research). The resistance change was calculated based on R0, the resistance value of the resting state (at zero applied pressure). For the strain sensor test, a rectangular hydrogel film (1 cm×4 cm) was prepared. The electrode was attached to a copper tape on both ends and placed on a finger joint. While bending the finger, the resistance values of each hydrogel were measured in a manner similar to that of the pressure sensor. The resistance change was calculated based on R0 and the resistance value in the no-bending state.

1.14. 3D Printing

The 3D scaffolds were printed with the GH as an ink using a custom-built 3D bioprinting system with a three-axis stage using a computer controller at the Korea Institute of Machinery and Materials (Daejeon, Republic of Korea). The GH was filled into a syringe and extruded at a pressure of 200 kPa through an 18G nozzle. The printed 3D constructs were heated at 70° C. for 60 min. Mouse C2C12 myoblasts were maintained in a growth medium (10% (v/v) FBS and 1% (v/v) antibiotic-antimycotic solution in high glucose DMEM) at 37° C. and 5% $CO_2$. The printed 3D constructs were sterilized by soaking in 70% ethanol and exposure to ultraviolet light for 3 hours. The samples were incubated overnight in myoblast growth medium. C2C12 myoblasts were seeded at a density of $2.0 \times 10^4$ cells cm-2 on each sample. Then, the cell-seeded scaffolds were stained with Alexa Fluor 488 phalloidin mentioned above.

Example 2. Fabrication of Self-Assembly Granular Hydrogels

Unmodified GO showed a negative charge with −38 mV of zeta potential, whereas PEI-conjugated GO (PEI-GO) had a zeta potential value of approximately 30 mV with conversion of negative to positive charge. These two GOs with different charges and a large difference in zeta potential were used to deposit GO onto agarose microbeads using the LbL method. By controlling the LbL layer numbers of GO (negative) and PEI-GO (positive), each GAM was successfully produced with a negative or positive charge, as evidenced by changes in zeta potentials (FIG. S3), and were found to be spherical (FIG. 1B). The GAMs that were layered twice (GAM2+) and thrice (GAM3-) were used as positively charged GAMs and negatively charged GAMs, respectively. By mixing these GAMs having opposite charges, a self-assembly granular hydrogel was produced via electrostatic interactions (FIG. 1A). The produced granular hydrogel (GH) could be easily transferred using a spatula or a pipette and used as a tractable precursor material for fabricating constructs of various shapes using 3D printing or molds (FIG. 1B).

Example 3. Fabrication of Thermally Annealed Graphene-Channeled Agarose Hydrogel (TAGAH)

Figure 2:
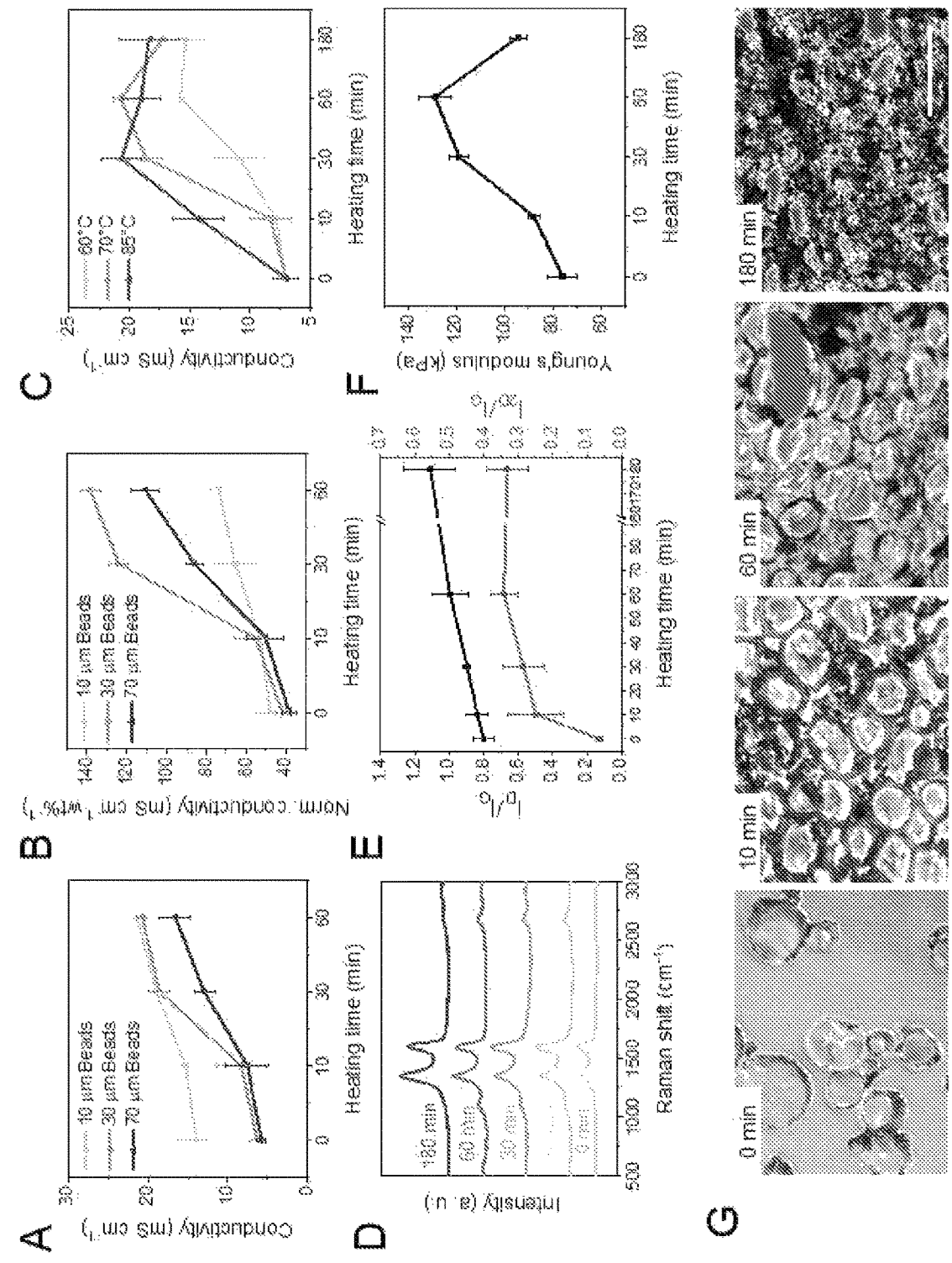
FIG. 2 shows (A) the results of measuring the conductivity of the samples prepared with various GAMs of different sizes (heating to 70° C. for 60 minutes), (B) the normalized conductivity of the TAGAH to the amount of the GO content, (C) conductivity changes in the TAGAH after heating at different temperatures and time points, (D) Raman spectra of the TAGAH annealed at 70° C. for different times, (E) a plot of the ratios ($I_D/I_G$ and $I_{2D}/I_G$) of the intensities of the D-, 2D-, and G-bands in the Raman spectra, (F) the Young's modulus of the TAGAH after heating at different temperatures and time points, and (G) optical micrographs of the cryo-sectioned samples annealed at 70° C. for various times. Scale bar: 50 μm.

To study the effects of various sizes of microbeads, agarose microbeads (AMs) were divided by size into <30 µm, to 50 µm, and >50 µm using sieves, of which average (median) diameters were approximately 8 µm, 31 µm, and 75 µm, respectively. These individual microbeads were coated with graphene flakes (GO and GO-PEI) to produce GAMs (GAM2+ and GAM3−) and GHs. Each produced GH was thermally annealed by heating to 70° C. As a result, the conductivity of all the prepared TAGAH samples gradually increased with the heating time (FIG. 2a). The TAGAH produced from 8-µm GAMs showed higher conductivity than the others. Interestingly, the TAGAH produced from 31-µm GAMs showed a conductivity similar to that of the TAGAH produced from 8-µm GAMs and a conductivity higher than that of the TAGAH produced from 75-µm GAMs, after 30 min of thermal annealing at 70° C. It should be noted that smaller GAMs contain a larger amount of GO because of their higher surface area-to-volume ratios. Thus, as a result of comparing the conductivity normalized by the amount of GO in each TAGAH, it was clearly confirmed that the hydrogels produced from 31-µm GAMs had more efficient conductive networks than the others (FIG. 2b). Small GAMs are favorable for close packing and graphene network formation during annealing, as small spheres have more contact points with others than large spheres at a given volume (M.-J. Kim et al., Sci. Rep. 10 (2020) 11923). On the other hand, GAMs that are too small may form too many random contacts and inefficient conductive channels. As a result, 31-µm GAMs were determined to be the most appropriate to efficiently form a conductive network. In particular, the conductivity of TAGAH produced from 31-µm GAMs increased 3.7-fold by thermal annealing at 70° C. for 60 min.

Next, an experiment was conducted using 31-µm GAMs in order to examine the effects of annealing temperature (60, 70, and 85° C.) and time (0 to 180 min) on conductivity. As a result, at all tested temperatures, the conductivity gradually increased during heating (FIG. 2C). Thermal annealing at 60° C. resulted in a conductivity increase to 5.7±1.0 mS $cm^{-1}$ after 60 min with no change thereafter. On the other hand, at higher temperatures (70 and 85° C.), the conductivity increased faster but decreased after the optimal time points (60 min and 30 min). Considering the reproducibility and convenience of handling, the optimal thermal annealing conditions were determined to be 70° C. and 60 min. The conductivity of TAGAH obtained under the above conditions was 20.7±0.6 mS $cm^{-1}$, in which the GO content was only 1.5±0.7 mg $mL^{-1}$. Raman spectroscopy revealed that the GO component in GH was reduced during thermal annealing (FIG. 2D). The intensity ratios of the D- and G-bands in the Raman spectra of TAGAH gradually increased during heating, indicating the thermal reduction of GO to more conductive rGO (FIG. 2E). In addition, 2D peaks (2,680 $cm^{-1}$) in the Raman spectra appeared after annealing, suggesting $sp^2$ carbon restoration and stacking of the graphene flakes (A. C. Ferrari, D. M. Basko, Nat. Nanotechnol. 8 (2013) 235-246; and D. Yang et al., Carbon. 47 (2009) 145-152). Thus, it was confirmed that heat treatment could cause reorganization of the graphene flakes to multiple stacks. In addition, it was confirmed that the increase in conductivity of the sample could be at least partly attributed to the thermal reduction of GO to rGO and its stacking and connection.

Changes in the Young's modulus of the sample during thermal annealing showed trends similar to those in conductivity (FIG. 2F), likely due to the fusion of the individual GAMs. In particular, it was confirmed that the Young's modulus value (129±7 kPa) of TAGAH produced by heating at 70° C. for 60 min was similar to that of soft tissues, such as human skeletal muscles (5 to 170 kPa) and skin (60 to 850 kPa) (J. Liu et al., Int. J. Mol. Sci. 16 (2015) and C. F. Guimaraes et al., Nat. Rev. Mater. 5 (2020) 351-370), thus mimicking soft tissues (C. F. Guimaraes et al., Nat. Rev. Mater. 5 (2020) 351-370).

In addition, an experiment was conducted to analyze the conductivity of GAMs having different coatings, including GAM1− and GAM2+; GAM2+ and GAM3−; and GAM3− and GAM4+. As a result, it was confirmed that TAGAH produced using GAM2+ and GAM3− exhibited a higher conductivity and a smaller amount of GO compared to the others. In addition, Cryo-section images of GH and TAGAH revealed that thermal annealing induced the formation of honeycomb-like porous structures (FIG. 2G). This structural change was expected to be associated with the phase change of agarose, resulting in the fusion of loosely bound agarose microbeads in GH to monolithic hydrogels. Above the melting temperature of agarose (about 60° C.), the GAMs appeared to fuse together with organized connections to monolithic hydrogels. Interestingly, voids or internal pores were observed in the TAGAH, which might be the space occupied by the original agarose microbeads in the GH. Such organized structures were prominent for TAGAH after 10 and 60 min of heating at 70° C. However, excessive annealing (over 60 min) caused the collapse and disappearance of such internal structures. These findings can account for the changes in the electrical conductivity and Young's modulus of the samples during annealing. In particular, this fully connected graphene pathway can efficiently deliver electron signals in the hydrogel and promote the conductivity of TAGAH. Small angle X-ray scattering (SAXS) peaks, speculated to correspond to distances between the stacked GOs on the GAM (6.6 Å) and between the adjacent GAMs (8.4 Å) in the GH, changed to a single peak (8.2 Å) in the TAGAH after thermal annealing. These spectral changes might be attributed to the rearrangement of the stacked GOs on the individual GAMs to ordered layers and the inclusion of agarose into these graphene layers. This result is in agreement with the results of Raman spectra, in which the $I_{2D}/I_G$ ratio increased, likely due to stacking and merging of the graphene flakes with heat treatment. In addition, TAGAH incubation in PBS for 1 week did not cause component elution (i.e., rGO and agarose) to the medium or shape changes, indicating good stability of the TAGAH.

Example 4. Characterization of Structural Organization of the TAGAH

Figure 3:
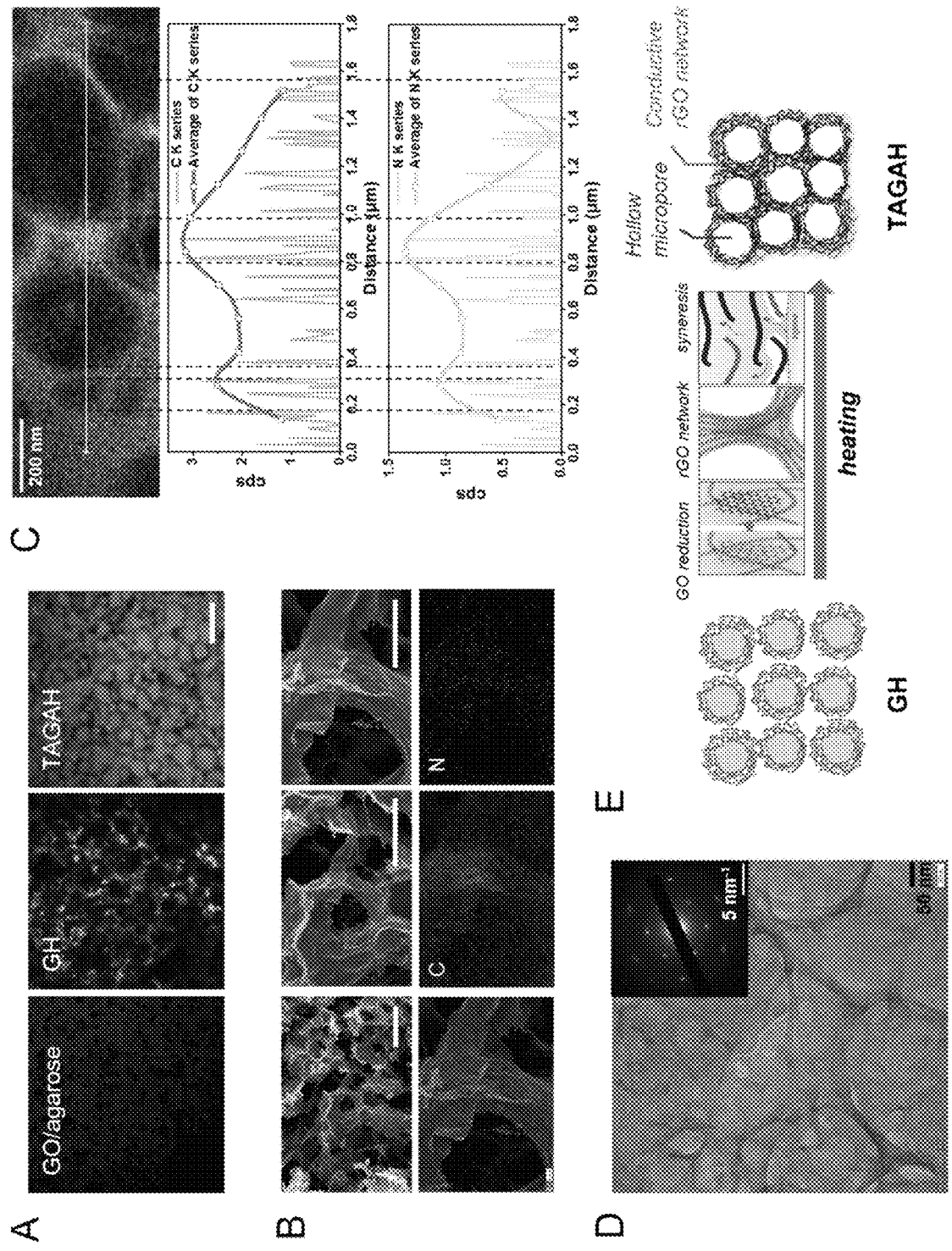
FIG. 3 shows (A) confocal fluorescence microscopes of the various hydrogels shortly incubated in fluorescence solution (0.05 mg/mL methylene blue). Scale bar: 20 μm, (B) scanning electron micrograph (SEM)/energy dispersive X-ray spectroscopy (EDS) images of the TAGAH. Scale bar: 50 μm, (C) high-magnification cross-sectional transmission electron microscopy (TEM) image and EDS line scan profile of the TAGAH showing the presence of graphene networks, and the results of plotting carbon and nitrogen atom signal profiles along the line in the image. Scale bar: 200 nm, (D) TEM image and SAED pattern (inset) of the TAGAH, and (E) schematic illustration of thermally-induced reorganization of GO and agarose to form macroporous interconnected networks.

In-depth studies on the structural organization of GO and agarose by thermal annealing of GH to TAGAH were performed to elucidate their structure-property relationships. For comparison, the inventors of the present disclosure tested i) GO/agarose (blending agarose and GO), ii) GH (before annealing), and iii) TAGAH (after annealing at 70° C. for 60 min). The presence or absence of graphene and its distribution were examined using polarized optical microscopy (POM) (S. Zhang et al., Int. J. Mol. Sci. 21 (2020) 1608). POM images clearly indicated that GO flakes were found on individual GAMs in the GH, and the microbeads appeared to be weakly connected to each other. In contrast, TAGAH showed a uniform distribution of GO flakes with a well-connected honeycomb-like network. To visualize the aqueous void phases in the hydrogels, each sample was quickly incubated in methylene blue solution, and confocal microscope images were acquired. As a result, as shown in FIG. 3A, GO/agarose showed weak fluorescence in all regions, likely due to the minimal aqueous phase in the hydrogel. In addition, dark regions appeared to be due to the local aggregation of GO flakes. In case of GH, intense fluorescence signals were observed in the inter-particle space, and dark spherical regions were observed in the GAMs. Interestingly, the fluorescence of TAGAH was opposite to that of GH, and the circular void regions showed strong fluorescence, whereas the network showed minimal fluorescence. These results imply that GAMs fused together, formed connected networks, and were reorganized into a highly porous structure. During heating, molten agarose might move toward the periphery of the particles (graphene-layered zones), infiltrate the graphene layers by capillary force, and become concentrated. This speculation associated with agarose infiltration can explain the slight increase in the GO (rGO) stack distance after thermal annealing in the SAXS results. This migration and enrichment of agarose at elevated temperatures is widely known as syneresis (the spontaneous exclusion of water) (S. Boral et al., Int. J. Biol. Macromol. 46 (2010) 232-236). Such a macroporous structure could also be observed from the TAGAH prepared using IgG-Alexa Fluor 488-containing agarose microbeads, in which a bright fluorescence network was observed while the void spheres remained dark.

Scanning electron micrographs (SEM) and elemental analysis using energy dispersive X-ray spectroscopy (EDS) revealed macroporous structures consisting of carbon and nitrogen atoms in TAGAH (FIG. 3B). The SEM images of agarose, GO/agarose, and GH did not exhibit the connected macroporous structures observed in the TAGAH images. The chemical composition of the TAGAH was further analyzed by EDS in the scanning transmission electron microscopy (STEM) mode. Nitrogen atoms (originating from GO-PEI) depicted in high-magnification TEM/EDS images were shown to be located along the reorganized matrix (FIG. 3C), suggesting an entirely connected graphene network in the TAGAH. In addition, transmission electron microscopy (TEM) images and selected area electron diffraction (SAED) patterns confirmed the presence of GO in the macroporous hydrogel (FIG. 3D). The TAGAH films sectioned with a cryomicrotome exhibited lacey structures with macropores, and the corresponding SAED pattern exhibited first-order reflections with the hexagonal characteristics of a GO sheet lattice (with a periodicity close to 3.4 nm). The GO/agarose did not exhibit any macroporous structures in which the GO flakes were randomly dispersed in the agarose. Altogether, it can be concluded that, during thermal annealing, the molten agarose moves toward the graphene layers, leaving the core part hollow and forming a macroporous network, which was accompanied by stacking and reorganization of graphene flakes (FIG. 3E).

Example 5. Characterization of Electrical and Mechanical Properties of TAGAH

Figure 4:
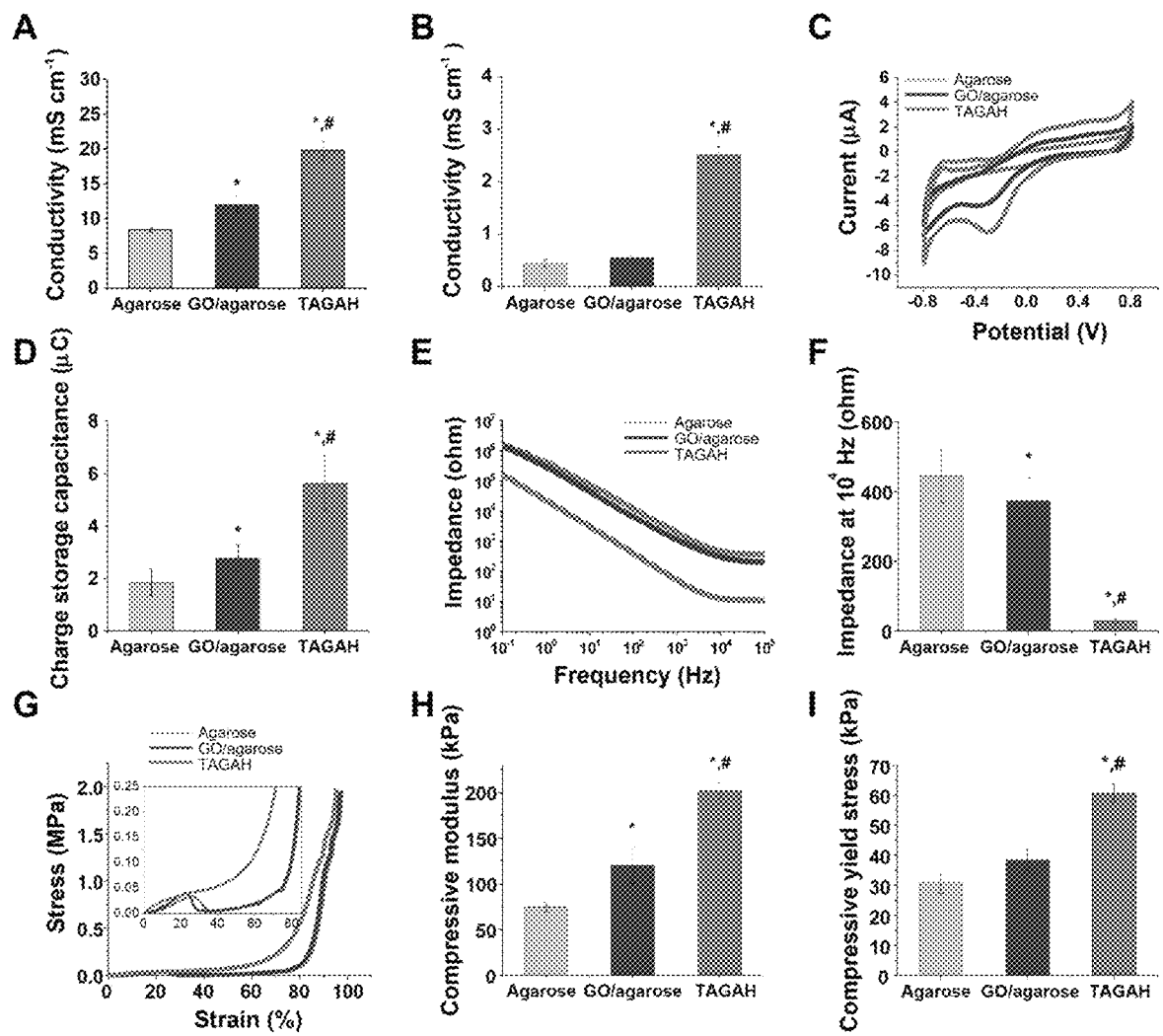
FIG. 4 shows (A) the results of measuring the conductivity of the hydrogels (agarose, GO/agarose, and TAGAH) in PBS, (B) shows the results of measuring the conductivity of the hydrogels in DI water, (C) the results of measuring the cyclic voltammograms (CVs) of the hydrogels, (D) charge storage capacitance calculated from CVs, (E) the results of electrical impedance spectroscopy (EIS) of the hydrogels, (F) the result of measuring the impedance of the hydrogels at $10^4$ Hz, (G) shows the results of a compression test for the hydrogels (inset is the magnified plot, (H) shows the compressive modulus of the hydrogel, and (I) the yield stress of the hydrogels.

The electrical and mechanical properties of TAGAH were characterized and compared with those of agarose, GO/agarose, PEI-coated GO/agarose, and GH. Electrical conductivities of the TAGAH in phosphate-buffered saline (PBS) and deionized (DI) water was 19.7±1.4 mS cm$^{-1}$ and 2.5±0.2 mS cm$^{-1}$, respectively, which were 1.7 fold and 4.5 fold higher than that of GO/agarose (FIGS. 4A and 4B). GO-free agarose showed low electrical conductivity in both PBS and DI water. Cyclic voltammograms (CVs) showed efficient charge storage and transfer of the TAGAH with distinct redox peaks at −0.25 V/saturated calomel electrode (SCE) and 0.2 V/SCE (FIG. 4c). The charge storage capacity of TAGAH was 5.7±1.1 μC, which was 3- and 2-fold higher than those of agarose and GO/agarose, respectively (FIG. 4D). The high charge storage capacitance of TAGAH might result from the conductive graphene network formed along the highly porous structure, providing a large electrochemical surface area of the electrode.

In addition, electrochemical impedance spectroscopy (EIS) revealed that the incorporation of GO into agarose (GO/agarose) slightly decreased impedance compared to the impedance of agarose (FIG. 4E). Impedance of TAGAH was significantly lower at the entire range of frequency (0.1 to 10$^5$ Hz) compared to that of agarose and GO/agarose. The impedance of TAGAH was 29.2±6.9Ω at $10^4$ Hz, which is in range of physiologically relevant frequencies ($10^2$ to $10^5$ Hz) (J. Deng et al., Nat. Mater. 20 (2021) 229-236) and was more than 10-fold lower than that of the control groups (FIG. 4F). The improved electrical and electrochemical properties of TAGAH might be attributed to the connected rGO channel, which supports both electron transfer and electrochemical reactions.

Compression tests indicated improved mechanical strength of the TAGAH, whereas agarose and GO/agarose hydrogel samples were brittle (strain <30%) (FIG. 4G). TAGAH showed a compressive modulus of 202±9 kPa, which was 2.7 fold and 1.7 fold higher than that of agarose and GO/agarose (FIG. 4H). In addition, compressive yield stresses of agarose, GO/agarose, and TAGAH were 31.1±3.6 kPa, 38.5±3.6 kPa, and 60.9±2.9 kPa, respectively (FIG. 4I), indicating that TAGAH displayed superior elasticity and structural stability. Monolithic macroporous structures with high local agarose concentration and GO reinforcement in TAGAH might contribute to the improved mechanical stability against fracture by dissipating external energy and preventing crack propagation (P. Nautiyal, B. Boesl, Carbon. 132 (2018) 59-64). As a result, the TAGAH of the present disclosure exhibited good electrical and mechanical properties suitable for various biomedical applications.

In the present disclosure, the TAGAH displayed high conductivity (~20 mS $cm^{-1}$) at 0.15 wt % graphene flakes, which is superior to other conductive hydrogels made of graphene and its derivatives. This excellent electrical property is mainly attributed to the interconnected rGO network, which enabled the production of conductive hydrogels with a low graphene content. In general, large amounts of GO and/or more conductive graphene derivatives (i.e., rGO) are required to obtain graphene composite hydrogels with high electrical conductivity. Importantly, the creation of a connected graphene network within the composite can greatly improve the electrical conductivity, even with a low content of graphene in the hydrogel. A similar concept was demonstrated by Unkel et al. (Nano Lett. 21 (2021) 3690-3697). They used tetrapodal-shaped zinc oxide microparticles (t-ZnO) as network templates. They coated GO onto t-ZnO and then polymerized the polyacrylamide hydrogel in the GO-coated t-ZnO. After the removal of t-ZnO templates by etching, a hollow graphene network could be formed in the polyacrylamide hydrogels, which had an excellent conductivity of 18 mS $cm^{-1}$ with 3.2 mg $mL^{-1}$ GO. In the present disclosure, conductivity normalized with graphene content clearly demonstrates that the TAGAH display excellent electrical properties with a small amount of GO compared to other materials. In addition to improved conductivity, TAGAH were mechanically soft, likely because we employed a small amount of GO and created a microporous internal structure.

Biomaterials with tissue-like softness (in tens to hundreds of kPa) are favored to interface with soft biological tissues because rigid materials prohibit intimate contact with soft tissues, and mechanical mismatch frequently causes inflammatory reactions at tissue interfaces (E. Axpe et al., Nat. Commun. 11 (2020) 3423 and K. C. Spencer et al., Sci. Rep. 7 (2017) 1952). Therefore, TAGAH displaying high conductivity (about 20 mS $cm^{-1}$) and softness (about 130 kPa) is advantageous for various biomedical applications interfacing with living tissues, such as bioelectronics and conductive tissue engineering scaffolds.

Example 6. Biocompatibility Test In Vitro and In Vivo of TAGAH

Figure 5:
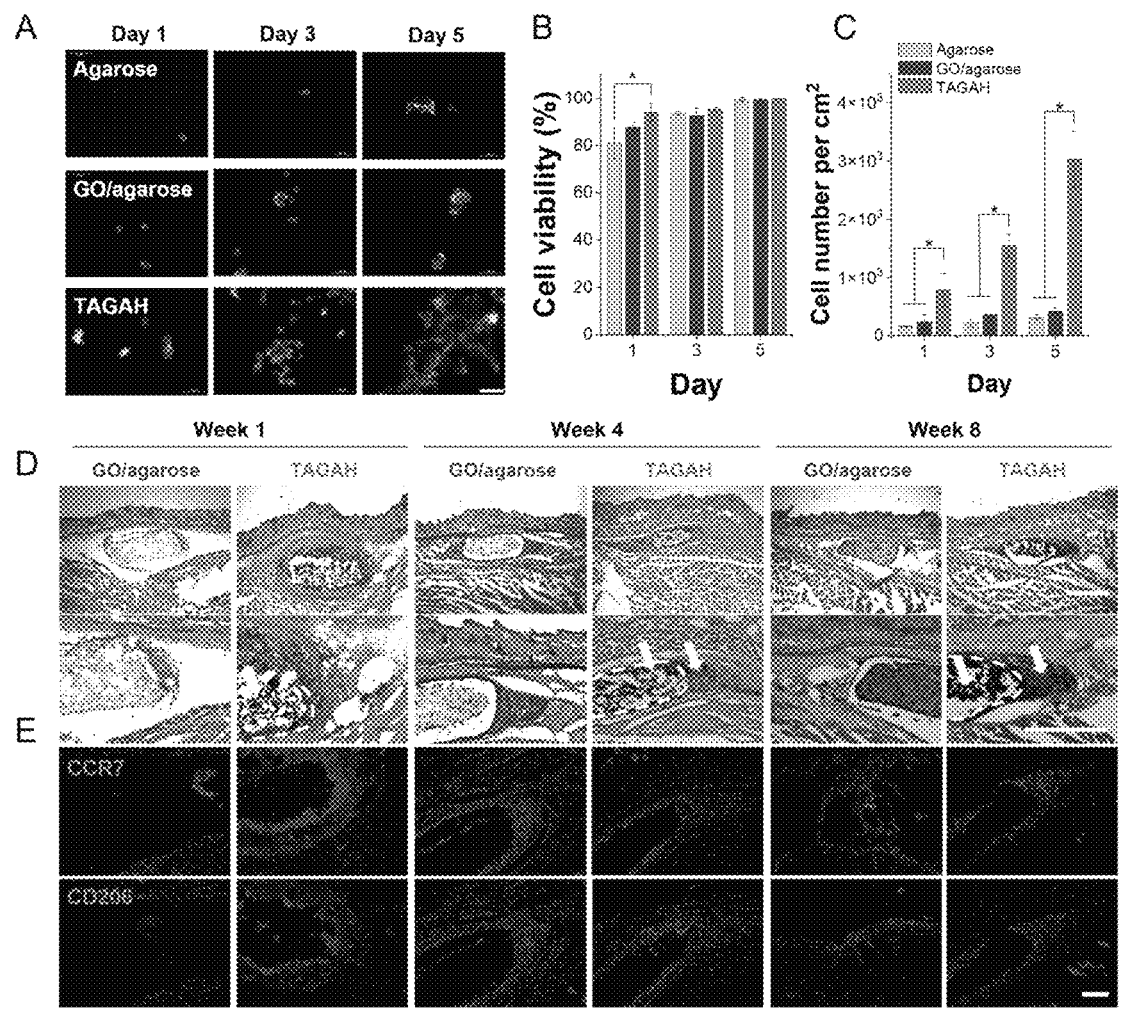
FIG. 5 depicts (A) fluorescence images of the fibroblasts cultured on agarose, GO/agarose, and TAGAH, and shows the results of staining nuclei (blue) and actin (green) after cell incubation for 1, 3, and 5 days. Scale bar: 200 μm, (B) the cell viability (%) on each sample, (C) the numbers of cells per image area (cm$^2$) on each sample, (D) the results of H&E staining of the tissues after subcutaneous implantation of GO/agarose and TAGAH for 1, 4, and 8 weeks (yellow arrows: infiltrated cells, white arrows: residual graphene flakes). Scale bar: 2 mm, and (E) the results of immunostaining of the tissue sections implanted with GO/agarose and TAGAH for CCR7 (pro-inflammatory marker) and CD206 (anti-inflammatory marker). Scale bar: 200 µm.

The inventors of the present disclosure examined the biocompatibility of TAGAH in comparison with agarose and GO/agarose controls. In vitro fibroblast culture revealed appropriate cell attachment and growth on TAGAH (FIG. 5A). In addition, immunostaining (actin staining, green) indicate cell filopodia and well-spread morphology of the cells on TAGAH (FIG. 5A). Cells on TAGAH showed slightly higher cell viability (94.1±3.8%) than those on agarose (81.1±6.4%) and GO/agarose (87.0±2.0%) at day 1. Cell viability in all samples remained high (>95%) during incubation for up to 5 days (FIG. 5B). The cell count on TAGAH on day 1 was significantly higher than that on agarose and GO/agarose and gradually increased over the incubation period (FIG. 5C). In contrast, sparse cells were found on the two controls. In addition, metabolic activity analyses also indicated higher cell activities and proliferation on TAGAH compared to agarose and GO/agarose. Agarose is generally unfavorable for cell binding because of its minimal cell-interactive moieties (E. Cambria et al., Front. Bioeng. Biotechnol. 8 (2020) 346). However, graphene and/or its derivatives have been reported to promote the adhesion and proliferation of various types of cells, such as mesenchymal stem cells, since GO or rGO can absorb extracellular matrix proteins from the media (Kenry, W. C. et al., Biomaterials. 155 (2018) 236-250 and J. Kim et al., J. Mater. Chem. B. 1 (2013) 933-938). In addition, non-smooth surface structures likely provide large surface areas and topography for cell adhesion and growth. However, the fibroblasts did not infiltrate the TAGAH, likely because its large pores were not exposed to the surface.

Figure 6:
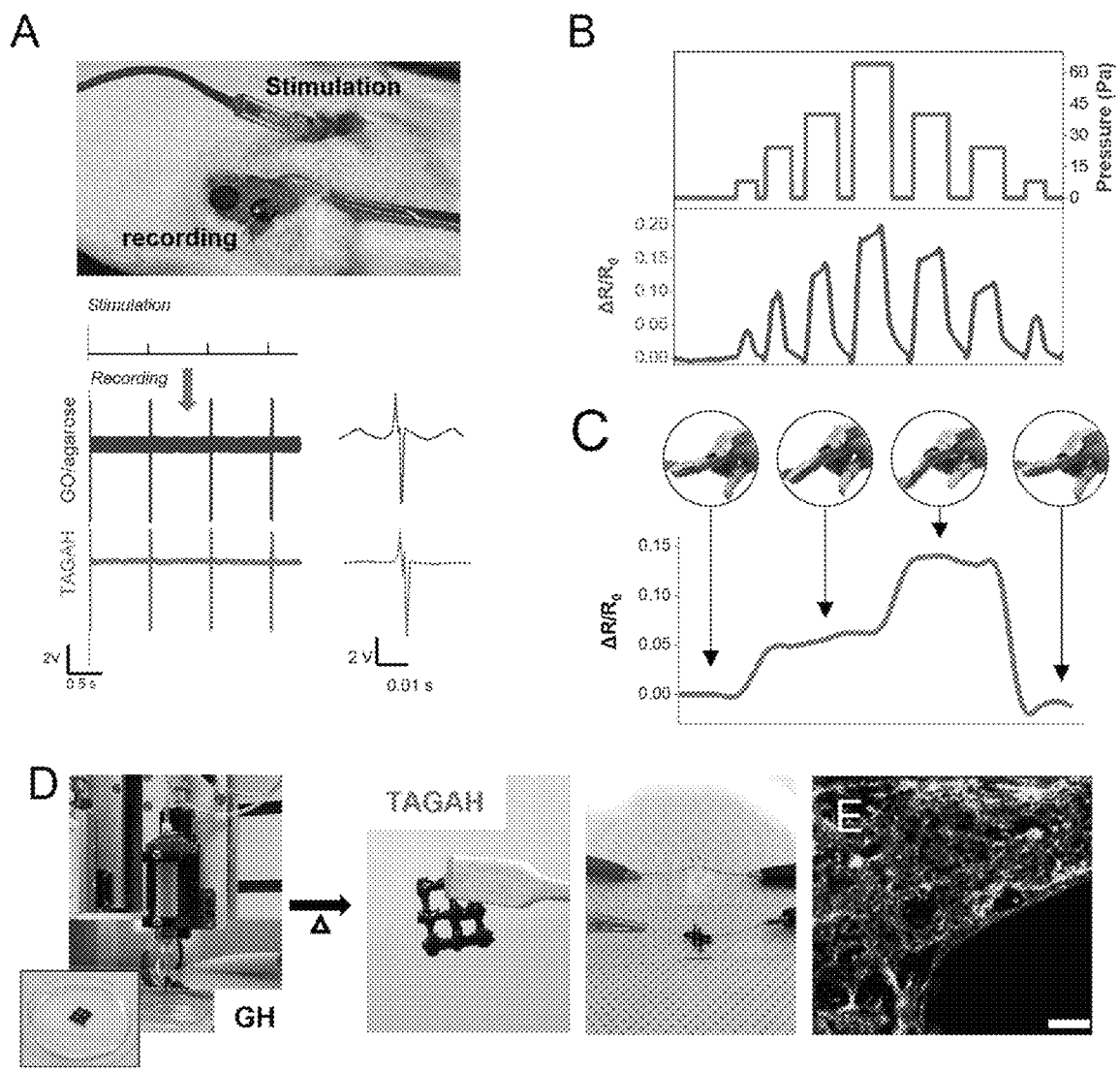
FIG. 6 shows (A) a photograph and the recorded signals of the electrophysiological EMG measurement with GO/agarose and TAGAH electrodes at the surface of the tibialis anterior muscle, (B) pressure sensor application of TAGAH, (C) strain sensor application of the TAGAH, (D) 3D printing of GH heated to produce a 3D construct (left panel), and shows that the printed TAGAH scaffold is free-standing and electrically conductive (right panel), and (E) the results of in vitro myoblast culture on 3D printed TAGAH. Scale bar: 100 µm.

Histological analysis after subcutaneous implantation in mice indicated no severe symptoms of inflammation from GO/agarose and TAGAH samples at 1, 4, and 8 weeks (FIG. 5D). By the way, TAGAH samples were found to be well integrated with tissues, whereas GO/agarose showed large gaps with the tissues. These differences might result from the microporous structure of TAGAH that allow for cell infiltration and eventual integration with the host tissue. In particular, as shown in FIG. 6D (marked with yellow arrows), cell infiltration into the TAGAH could be observed 1 week after implantation and was more prominent later. Biodegradation is an important factor in implantable biomaterials for tissue engineering applications. TAGAH gradually biodegraded after implantation, whereas GO/agarose degraded much slower. After the degradation of TAGAH, graphene flakes (marked with white arrows) remained in the vicinity of the surrounding tissue. However, these graphene flakes did not cause any noticeable inflammation.

Furthermore, inflammatory tissue responses were examined by immunostaining of macrophages. The inventors of the present disclosure employed a pro-inflammatory marker (CCR7) for M1 macrophage staining and an anti-inflammatory marker (CD206) for M2 macrophage staining (W. Liu et al., Adv. Sci. 5 (2018) 1800749). As shown in FIG. 5E, one week after implantation, more M1 and M2 macrophages were found around the TAGAH compared to those around GO/agarose, likely because degradable and macroporous TAGAH might induce macrophage recruitment and infiltration (Y. Xu et al., Adv. Sci. 6 (2019) 1802077). At week 4 and 8, fewer M1 and M2 macrophages were found around TAGAH than those in the control (GO/agarose). In particular, strong CCR7 intensity in the control at week 8 and minimal CCR7 signal from TAGAH indicated lower levels of inflammatory response to TAGAH than those to GO/agarose. Analyses of the immunofluorescence images confirmed the observed macrophage polarization trends in the vicinity of the implants. In addition, the thickness of the cell granulates surrounding the samples was noticeably thinner in case of TAGAH than that in the control, indicating reduced scarring around TAGAH. Overall, the TAGAH was determined to be biocompatible and suitable as an implantable material. Nevertheless, the potential toxicity of graphene and its derivatives raises concerns for biomedical applications, and the toxicity of graphene derivatives is highly influenced by its characteristics, including size, charge, and functionalization (K. Yang et al., Small. 9 (2013) 1492-1503). Therefore, in-depth studies of the biocompatibility of TAGAH are necessary to clearly state the feasibility of TAGAH-based applications.

Example 7. Biomedical Application of TAGAH

Using the TAGAH system, the inventors of the present disclosure fabricated various electrically conductive constructs and demonstrated their utility in various biomedical applications, including implantable bioelectrodes, pressure sensors, wearable strain sensors, and 3D-printed tissue scaffolds. First, by injecting the GH into different molds and subsequently elevating the annealing temperature, conductive hydrogel constructs of various shapes could be easily obtained without the need for chemical crosslinkers or reagents (FIG. 1B). It should be noted that the fabrication of most hydrogels, including conductive hydrogels, requires chemical crosslinkers and/or initiators with a mold to form intact constructs with specific shapes. This requires extensive washing steps to remove residual substances and byproducts. However, in the present disclosure, the TAGAH can be formed without the need for chemicals or a washing step, because the thermal annealing of the pre-shaped GH constructs can form stable TAGAH constructs without chemical reactions.

For potential biomedical applications of TAGAH-based conductive materials, the inventors of the present disclosure produced disc-shaped hydrogel electrodes for electromyography (EMG) (FIG. 6A). The conductive electrode developed in the present disclosure was soft and hydrated, which enabled conformal and intimate contact with the muscle tissue. EMG signals were recorded at the tibias muscle surface while stimulating the sciatic nerve with 1 V and 1 Hz pulse. The results indicated successful signal detection from the TAGAH-EMG electrode with an improved signal-to-noise ratio (SNR) (32.1±2.3 dB), which was 1.5-fold that of the GO/agarose electrode (21.1±0.1 dB).

In addition, the TAGAH-based pressure sensor could successfully measure pressure changes (FIG. 6B). The gauge factor of this pressure sensor was determined to be 4.8 kPa-1; its pressure sensing sensitivity was higher than that of conventional conductive hydrogel-based pressure sensors (H. Zhou et al., Chem. Eng. J. 403 (2021) 126307; G. Ge et al., Adv. Funct. Mater. 28 (2018) 1802576; and J. Yu et al., J. Mater. Chem. C. 9 (2021) 3635-3641). TAGAH can also be used as a strain sensor because their deformation leads to changes in resistance. The conductive hydrogel of the present disclosure on a finger joint led to resistance changes in response to bending movement, successfully demonstrating its good performance as a strain sensor (FIG. 6C). However, additional optimizations of fabrication configuration and conditions for TAGAH-based mechanosensors (e.g., pressure and strain sensors) are required in future studies to improve the response time and reproducibility.

GH can also be used as a bioink for 3D printing, as extrusion-based printing successfully formed intact grid features. The scaffold stably maintained its printed shape, even after heating. The printed construct was free-standing and exhibited good electrical conductance (FIG. 6D).

Finally, C2C12 myoblasts were seeded on 3D-printed TAGAH scaffolds and cultured (FIG. 6E). To demonstrate the potential uses of TAGAH scaffolds for tissue engineering applications, the inventors of the present disclosure selected the C2C12 myoblasts, as skeletal muscle is one of the electrically excitable tissues in the body and several reports have shown that enhanced myoblast growth and differentiation could occur on conductive substrates with electrical stimulation (Y. Zhang et al., Int. J. Pharm. 606 (2021) 120841; H. Jo et al., Acta Biomater. 48 (2017) 100-109; and J. Park et al., Acta Biomater. 97 (2019) 141-153). As expected from the results of in vitro cell viability tests, the cells on the scaffold grew well with a stretched morphology (FIG. 5A). Therefore, the TAGAH-based 3D-printed scaffolds of the present disclosure may be useful for tissue engineering. In particular, the conductive TAGAH scaffolds of the present disclosure are expected to efficiently deliver electrical signals to electroactive cells (e.g., muscle, cardiac, and neural cells) to modulate cellular behaviors (e.g., electroactivity, proliferation, and differentiation (H. Jo et al., Acta Biomater. 48 (2017) 100-109; J. Park et al., Acta Biomater. 97 (2019) 141-153; G. Zhao et al., NPG Asia Mater. 10 (2018) 982-994; J. Wang et al., HAdv. Mater. 32 (2020) 2004555; and G. Zhao et al., Acta Biomater. 139 (2022) 190-203). Overall, the template or mold-free construction of electrically conductive hydrogels of various shapes by 3D printing will permit patient-specific design of tissue engineering scaffolds and biosensors.

What is claimed is:

1. An electrically conductive hydrogel having a graphene network, which is fabricated by thermal annealing of granular hydrogel, wherein the granular hydrogel is produced by mixing of graphene-coated agarose microbeads having a positive surface charge and graphene-coated agarose microbeads having a negative surface charge.

2. The electrically conductive hydrogel of claim 1, wherein the graphene-coated agarose microbeads are produced by coating agarose microbeads with graphene flakes.

3. The electrically conductive hydrogel of claim 2, wherein the graphene flakes are composed of graphene oxide or positively charged polymer-conjugated graphene oxide.

4. The electrically conductive hydrogel of claim 2, wherein the agarose microbeads have a size of 10 μm to 50 μm.

5. The electrically conductive hydrogel of claim 1, wherein the thermal annealing causes reorganization of graphene flakes and agarose microbeads.

6. The electrically conductive hydrogel of claim 1, wherein the thermal annealing is performed at a temperature of 60° C. to 85° C. for 30 minutes to 60 minutes.

7. The electrically conductive hydrogel of claim 1, which has a porous structure.

8. The electrically conductive hydrogel of claim 1, which has an electrical conductivity of 1 to 30 mS $cm^{-1}$.

9. The electrically conductive hydrogel of claim 1, which has improved or increased compressive modulus and yield stress.

10. A method for fabricating an electrically conductive hydrogel having a graphene network, the method comprising performing thermal annealing of granular hydrogel, wherein the granular hydrogel is produced by mixing of graphene-coated agarose microbeads having a positive surface charge and graphene-coated agarose microbeads having a negative surface charge.

11. The method of claim 10, wherein the graphene-coated agarose microbeads are produced by coating agarose microbeads with graphene flakes.

12. The method of claim 11, wherein the graphene flakes are composed of graphene oxide or positively charged polymer-conjugated graphene oxide.

13. The method of claim 11, wherein the agarose microbeads have a size of 10 μm to 50 μm.

14. The method of claim 10, wherein the thermal annealing is performed at a temperature of 60° C. to 85° C. for 30 minutes to 60 minutes.

15. A scaffold for tissue engineering comprising the electrically conductive hydrogel of claim 1.

16. The scaffold of claim 15, which is fabricated by 3D printing using granular hydrogel as an ink.

17. A bioelectrode comprising the electrically conductive hydrogel of claim 1.

18. A biosensor comprising the electrically conductive hydrogel of claim 1.

* * * * *